(12) United States Patent
Bhorkar et al.

(10) Patent No.: US 10,798,741 B2
(45) Date of Patent: Oct. 6, 2020

(54) MULTI-CARRIER LISTEN BEFORE TALK

(71) Applicant: Intel IP Corporation, Santa Clara, CA (US)

(72) Inventors: Abhijeet Bhorkar, Fremont, CA (US); Hwan-Joon Kwon, Portland, OR (US); Christian Ibars Casas, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/523,794

(22) Filed: Jul. 26, 2019

(65) Prior Publication Data

US 2020/0022183 A1  Jan. 16, 2020

Related U.S. Application Data

(63) Continuation of application No. 15/752,481, filed as application No. PCT/US2015/065684 on Dec. 15, 2015, now Pat. No. 10,462,819.

(Continued)

(51) Int. Cl.
*H04L 5/00* (2006.01)
*H04W 74/08* (2009.01)
(Continued)

(52) U.S. Cl.
CPC .......... *H04W 74/0808* (2013.01); *H04L 5/00* (2013.01); *H04L 5/001* (2013.01); *H04L 5/0005* (2013.01);
(Continued)

(58) Field of Classification Search
CPC ....... H04L 5/00; H04L 27/0006; H04L 5/001; H04L 5/0005; H04W 74/0808; H04W 16/14
See application file for complete search history.

(56) References Cited

U.S. PATENT DOCUMENTS 10,462,819 B2   10/2019  Bhorkar et al.
2013/0196632 A1*  8/2013  Horn ..................... H04W 16/14
                                                    455/411

(Continued)

FOREIGN PATENT DOCUMENTS

CN         107852748 A      3/2018
WO    WO-2012078565 A1     6/2012

(Continued)

OTHER PUBLICATIONS

"U.S. Appl. No. 15/752,481, 312 Amendment filed Jun. 27, 2019", 4 pgs.

(Continued)

*Primary Examiner* — Anez C Ebrahim
(74) *Attorney, Agent, or Firm* — Schwegman Lundberg & Woessner, P.A.

(57) ABSTRACT

Systems, apparatus, user equipment (UE), evolved node B (eNB), computer readable media, and methods are described for multi-carrier listen before talk operations. In various embodiments, a transmitting device may assign one or more primary carriers to perform listen before talk (LBT) operations, with non-primary carriers performing a channel sensing operation at the end of the LBT operations of at least one primary channel. In various embodiments, the LBT operations at the primary carriers may use a shared random countdown number or an independent random countdown.

19 Claims, 13 Drawing Sheets

Related U.S. Application Data

(60) Provisional application No. 62/205,536, filed on Aug. 14, 2015.

(51) Int. Cl.
  *H04L 27/00* (2006.01)
  *H04W 16/14* (2009.01)
(52) U.S. Cl.
  CPC ........ *H04L 27/0006* (2013.01); *H04L 5/0007* (2013.01); *H04W 16/14* (2013.01)

(56) References Cited

U.S. PATENT DOCUMENTS

| | | | |
|---|---|---|---|
| 2015/0223244 A1* | 8/2015 | Tabet | H04W 72/12 370/329 |
| 2018/0255576 A1 | 9/2018 | Bhorkar et al. | |

FOREIGN PATENT DOCUMENTS

| | | |
|---|---|---|
| WO | WO-2014004156 A2 | 1/2014 |
| WO | WO-2017030603 A1 | 2/2017 |

OTHER PUBLICATIONS

"U.S. Appl. No. 15/752,481, Amendment Under 37 C.F.R. § 1.312 filed Sep. 24, 2019", 6 pgs.
"U.S. Appl. No. 15/752,481, Non Final Office Action dated Jan. 11, 2019", 12 pgs.
"U.S. Appl. No. 15/752,481, Notice of Allowance dated Mar. 27, 2019", 7 pgs.
"U.S. Appl. No. 15/752,481, PTO Response to Rule 312 Communication dated Sep. 30, 2019", 2 pgs.
"U.S. Appl. No. 15/752,481, Response Filed Mar. 4, 2019 to Non Final Office Action dated Jan. 11, 2019", 14 pgs.
"Chinese Application Serial No. 201580081715.7, Voluntary Amendment filed Oct. 16, 2018", W/ English Claims, 23 pgs.
"European Application Serial No. 15901870.4, Extended European Search Report dated Feb. 14, 2019", 7 pgs.
"European Application Serial No. 15901870.4, Response filed Oct. 1, 2018 to Communication Pursuant to Rules 161(2) and 162 EPC dated Mar. 21, 2018", 9 pgs.
"International Application Serial No. PCT/US2015/065684, International Preliminary Report on Patentability dated Mar. 1, 2018", 7 pgs.
"International Application Serial No. PCT/US2015/065684, International Search Report dated May 24, 2016", 3 pgs.
"International Application Serial No. PCT/US2015/065684, Written Opinion dated May 24, 2016", 5 pgs.
"On design options for LAA LBT enabling frequency reuse", Nokia Networks, R1-152812, 3GPP TSG RAN WG1 Meeting #81, Fukuoka, Japan, (May 15, 2015), 5 pgs.
"UE procedure for receiving DL transmissions in LAA", Qualcomm Incorporated, R1-152786, 3GPP TSG RAN WG1 #81, Fukuoka, Japan,, (May 16, 2015).

* cited by examiner

MULTI-CARRIER LISTEN BEFORE TALK

PRIORITY CLAIM

This application is a continuation of U.S. patent application Ser. No. 15/752,481, filed Feb. 13, 2018, which is a U.S. National Stage Filing under 35 U.S.C. 371 from International Application No. PCT/US2015/065684, filed Dec. 15, 2015 and published in English as WO 2017/030603 on Feb. 23, 2017, which claims the benefit of priority to U.S. Provisional Patent Application Ser. No. 62/205,536, filed on Aug. 14, 2015, and entitled "MULTI-CARRIER LBT DESIGN FOR LTE IN UNLICENSED BAND", each of which is incorporated herein by reference in its entirety.

TECHNICAL FIELD

Embodiments pertain to systems, methods, and component devices for wireless communications, and particularly to systems and methods for listen before talk (LBT) operation and license-assisted access to unlicensed frequencies with multiple carriers for long term evolution (LTE), LTE-advanced, and other similar wireless communication systems.

BACKGROUND

LTE and LTE-advanced are standards for wireless communication of high-speed data for user equipment (UE) such as mobile telephones. In LTE-advanced and various wireless systems, carrier aggregation is a technology where multiple carrier signals operating on different frequencies may be used to carry communications for a single UE, thus increasing the bandwidth available to a single device. In some embodiments, carrier aggregation may be used where one or more component carriers operate on unlicensed frequencies.

DETAILED DESCRIPTION

Embodiments relate to systems, devices, apparatus, assemblies, methods, and computer readable media to enhance wireless communications, and particularly to communication systems that operate with carrier aggregation and license-assisted access. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1A:
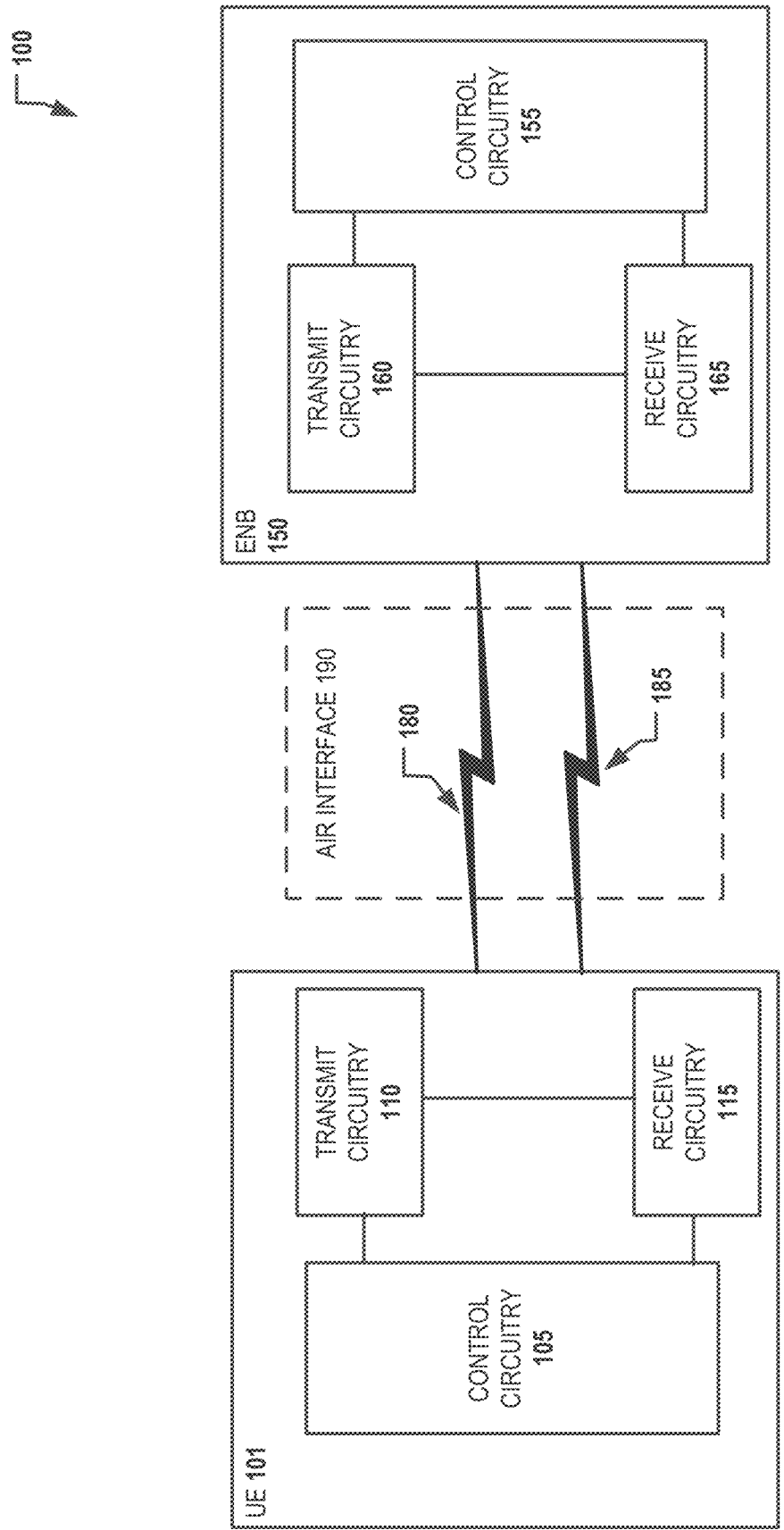
FIG. 1A is a block diagram of a system including an evolved node B (eNB) and a user equipment (UE) that may operate according to some embodiments described herein.

FIG. 1A illustrates aspects of a wireless network system 100, in accordance with some embodiments. The wireless network system 100 includes a UE 101 and an eNB 150 connected via an air interface 190. UE 101 and eNB 150 communicate using a system that supports carrier aggregation and the use of unlicensed frequency bands, such that the air interface 190 supports multiple frequency carriers and licensed as well as unlicensed bands. A component carrier 180 and a component carrier 185 are illustrated. Although two component carriers are illustrated, various embodiments may include any number of two or more component carriers. Various embodiments may function with any number of licensed channels and any number of unlicensed channels.

Additionally, in various embodiments described herein, at least one of the component carriers 180, 185 of the air interface 190 comprises a carrier operating in an unlicensed frequency, referred to herein as an unlicensed carrier. An "unlicensed carrier" or "unlicensed frequency" refers to a range of radio frequencies that are not exclusively set aside for the use of the system. Some frequency ranges, for example, may be used by communication systems operating under different communication standards, such as a frequency band that is used by both Institute of Electronic and Electrical Engineers (IEEE) 802.11 standards (e.g., "WiFi") and third generation partnership (3GPP) standards. By contrast, a licensed channel or licensed spectrum operates under a particular standard, with limited concern that other unexpected signals operating on different standards will be present.

Apart from the license assisted access (LAA) operation considered in Release 13 of the third generation partnership project (3GPP) standard (3GPP release 13, open of Sep. 30, 2012), LTE may also be operated via dual connectivity or the standalone LTE mode which may not require much assistance from the licensed spectrum Recently, a new LTE based technology "MuLTEfire" has been under consideration, requiring no assistance from the licensed spectrum to enable a leaner, self-contained network architecture that is suitable for neutral deployments where any deployment can service any device. The operation of LTE on the unlicensed spectrum without any assistance from licensed carrier will be referred to as standalone LTE unlicensed (LTE-U) herein.

As discussed below, when a system operates in an unlicensed spectrum, rules and operations for verifying that the unlicensed channels are available provide additional overhead and system operational elements that are not present in licensed channels. The sharing of a channel may be referred to as "fair coexistence", where different systems operate to use an unlicensed or shared channel while limiting both interference and direct integration with the other systems operating on different standards.

LTE cellular communications, for example, historically operate with a centrally managed system designed to operate in a licensed spectrum for efficient resource usage. Operating with such centrally managed use within unlicensed channels where systems not centrally controlled that use different channel access mechanisms than legacy LTE may be present carries significant risk of direct interference. Coexistence mechanisms described herein enable LTE, LTE-advanced, and communications systems building on or similar to LTE systems to coexist with other technologies such as WiFi in shared unlicensed frequency bands (e.g., unlicensed channels.)

Embodiments described herein for coexistence may operate within the wireless network system 100. In the wireless network system 100, the UE 101 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. The eNB 150 provides the UE 101 network connectivity to a broader network (not shown). This UE 101 connectivity is provided via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area, with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to FDM. The transmit circuitry 110 and the receive circuitry 115 may transmit and receive both control data and content data (e.g., messages, images, video, et cetera) structured within data blocks that are carried by the physical channels.

FIG. 1A also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers used with various UEs. The transmit circuitry 160 and receive circuitry 165 may be adapted to transmit and receive data, respectively, to and from any UE connected to the eNB 150. The transmit circuitry 160 may transmit downlink physical channels comprised of a plurality of downlink subframes. The receive circuitry 165 may receive a plurality of uplink physical channels from various UEs including the UE 101. The plurality of uplink physical channels may be multiplexed according to FDM in addition to the use of carrier aggregation.

As mentioned above, the communications across the air interface 190 may use carrier aggregation, where multiple different component carriers 180, 185 can be aggregated to carry information between the UE 101 and the eNB 150. Such component carriers 180, 185 may have different bandwidths, and may be used for uplink communications from the UE 101 to the eNB 150, downlink communications from the eNB 150 to the UE 101, or both. Such component carriers 180, 185 may cover similar areas, or may cover different but overlapping sectors. The radio resource control (RRC) connection is handled by only one of the component carrier cells, which may be referred to as the primary component carrier, with the other component carriers referred to as secondary component carriers. In some embodiments, the primary component carrier may be operating in a licensed band to provide efficient and conflict-free communications. This primary channel may be used for scheduling other channels including unlicensed channels as described below.

Figure 1B:
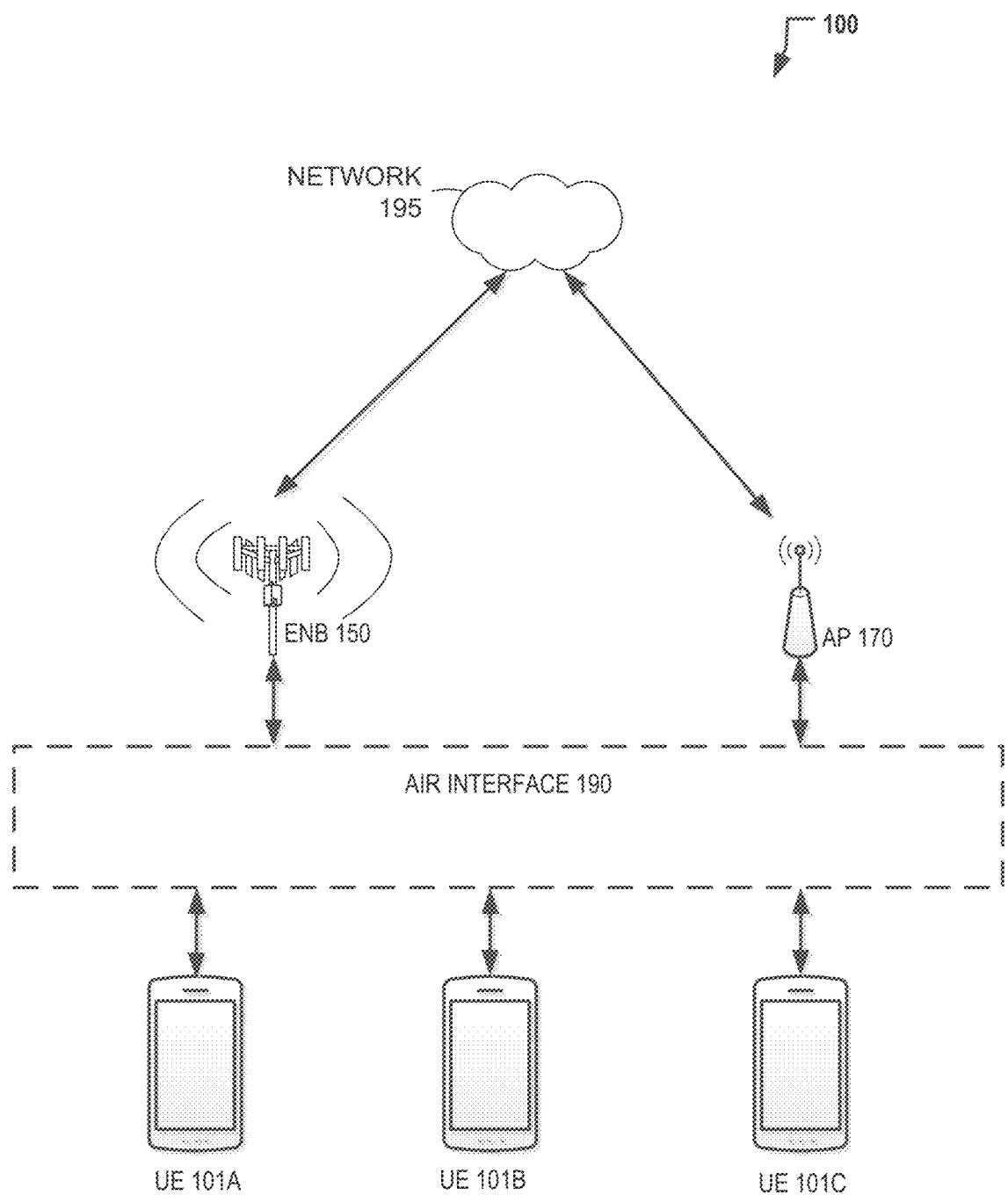
FIG. 1B is a block diagram showing additional aspects of the system, including multiple UEs along with an eNB and access point (AP) that may operate according to some embodiments described herein.

FIG. 1B illustrates additional aspects of the wireless network system 100 of FIG. 1A. As illustrated, the wireless network system 100 may provide multiple UEs 101A, 101B, 101C, and so on with access to a broader network 195 via air interface 190. The network 195 may be any suitable network, including various wide area networks (WANs) or the Internet. This access may be provided via the eNB 150 discussed above, via a wireless access point (AP) 170 providing wireless communications using a wireless local area network (WLAN) such as IEEE 802.11 mentioned above, or via both. In various embodiments, a wireless network system may include multiple APs in addition to the AP 170, and may include multiple eNBs in addition to the eNB 150 or small cells in support of the eNB 150.

Figure 1C:
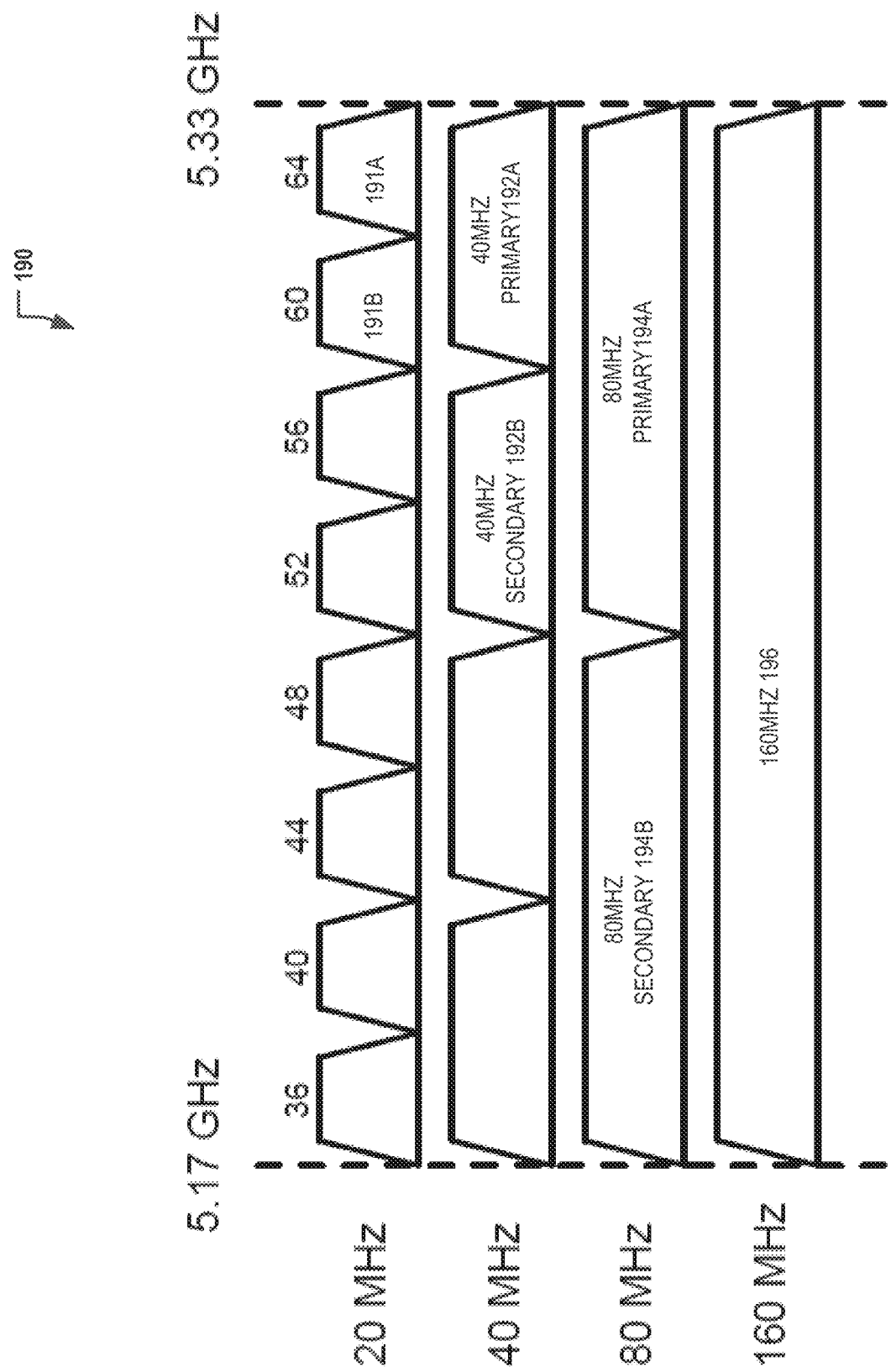
FIG. 1C illustrates aspects of an air interface in the system, operating according to some embodiments described herein.

FIG. 1C illustrates WLAN channelization options for a frequency band from 5.17 GHz to 5.33 GHz that may be part of an unlicensed portion of the air interface 190. The example channelizations for WiFi 802.11ac nodes include a set of 20 MHz channels including a primary 20 MHz channel 191A and a secondary 20 MHz channel 191B. The other channelizations are formed by combining contiguous 20 MHz sub-channels in a non-overlapping manner. One example channelization includes a 40 MHz primary channel 192A and a 40 MHz secondary channel 192B. Another channelization includes an 80 MHz primary channel 194A and an 80 MHz secondary channel 194B. Another channelization includes a 160 MHz channel 196. After deciding on a transmission bandwidth, one of the channels is chosen as a primary channel. The primary channel is chosen by the AP that is communicating with the UE.

A WiFi node performs a clear channel assessment (CCA) and extended CCA procedure to determine if the unlicensed channel is available for use only on the primary 20 MHz channel. The CCA and extended CCA procedure consist of sensing a channel for a predetermined duration and performing random back-off. After completion of the CCA and extended CCA procedure, the node only performs sensing just before the potential start of transmission on all the secondary channels. On the 20 MHz primary channel, the node detects the start of a valid OFDM packet at or above −82 dBm and holds CCA busy for the duration of the packet if start of the WiFi packet is detected via preamble detection. Detection is referred to as signal detect (SD), and the SD is performed while the node holds CCA busy for any signal above −62 dBm. The busy check for signals above −62 dBm is referred to as energy detect (ED). After completion of CCA on the primary channel, the node additionally performs CCA on the secondary 20 MHz channel with SD at −72 dBm and ED at −62 dBm. In one embodiment, SD is performed within 25 µs and ED within 4 µs. This refers to coexistence mechanisms at an AP. In certain embodiments, coexistence at an eNB may operate in various ways to complement AP operation on the same frequency band in the same area serving the same UEs.

Figure 2:
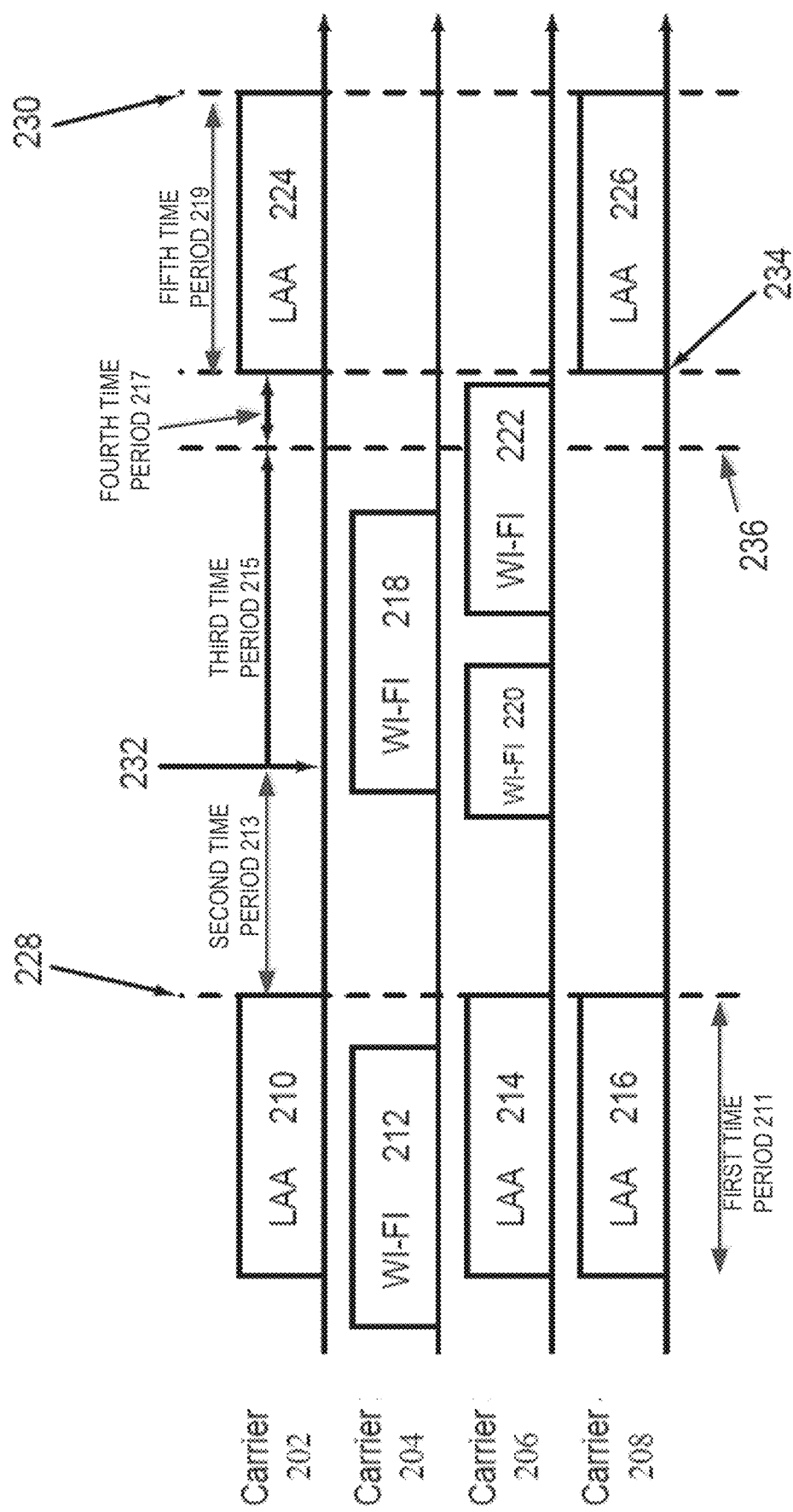
FIG. 2 illustrates aspects of multi-carrier listen before talk, according to some example embodiments.

FIG. 2 describes system operations performed by a device, which may either be a transmitting eNB or a transmitting UE, for coexistence between cellular communications operating under license-assisted access (LAA) and WiFi signals and possibly standalone LTE-U operation. For the purposes of illustration, FIG. 2 is described with respect to eNB transmission. The system of FIG. 2 includes four unlicensed channels used by carriers 202, 204, 206, and 208. The carriers need not be adjacent (e.g., there may be other carriers between the illustrated carriers, such that an eNB may use unlicensed channels which are not adjacent.) The eNB operates using listen before talk (LBT) operations which are independent for each channel but that use limitations to improve performance. This includes support for synchronous transmissions on multiple unlicensed channels to improve wideband channel access. This may be achieved in some embodiments by deferring transmissions on some unlicensed channels until other carriers complete LBT. Additionally, some embodiments may operate with aligned LBT operations among multiple carriers. In such embodiments, once at least one carrier out of all the potential transmission carriers starts to transmit, other carriers do not perform a countdown regardless of how severe RF leakage is. When transmissions from one or more carriers ends, all the carriers perform a post transmission back-off with a new counter value that is applied commonly to all the carriers. This operation can mitigate against the eNB excessively accessing the channel. Allowing simultaneous LBT operations by multiple carriers increases the number of contending nodes, compared to WiFi operation, where only the primary carrier participates in channel contention.

As shown in FIG. 2, carrier 204 is initially occupied by WiFi signal 212, with the eNB transmitting LAA signals 210, 214, and 216 on corresponding carriers 202, 206, and 208 during a first time period 211. When the transmission terminates at a time 228, the eNB generates a random back-off counter that makes the previously used channels associated with the carriers 202, 206, and 208 available for use by other systems and devices. The back-off counter counts during a second time period 213 up to a time 232, at which a self-deferral period occurs for a third time period 215 as part of the LBT operation. In various different embodiments described below, the eNB may perform LBT including the countdown of a back-off counter with a subsequent self-deferral period for different combinations of channels. In some embodiments, only a single primary channel may have LBT operations with the back-off counter and self-deferral in the third time period 215. In other embodiments, all channels may be sensed for LBT with either shared or independent back-off counters followed by the self-deferral period after a first back-off counter reaches zero. In some embodiments, a subset of multiple channels may be sensed during a back-off countdown and the deferral period. Channels which are sensed during the back-off counter and self-deferral periods are referred to as primary channels. For these primary channels having LBT, if a signal such as WiFi 218, 220, or 222 is sensed during the third time period 215, that carrier is not used during the next transmission by the eNB. When the LBT operations end at a time 236, a channel sensing is performed on all available non-primary channels during a fourth time period 217 that ends at time 236 to verify that the channels are not in use just before a transmit operation. If any communication is sensed during the fourth time period 217, the channels that the communication is sensed on are not used for transmission during a fifth time period 219. In the embodiment of FIG. 2, WiFi 218 is sensed by LBT during the third time period 215 and either WiFi 220 or 222 is sensed during LBT or during the channel sensing of the fourth time period 217. Because of this, the carrier 204 and the carrier 206 are not used during the fifth time period 219, while LAA 224 is communicated on the carrier 202 and LAA 226 is a transmission communication on the carrier 208. When transmission of LAA 224 and LAA 226 end at time 230, the process may either repeat, if additional information is to be transmitted, or the device may go into an inactive mode with no transmissions.

Figure 3:
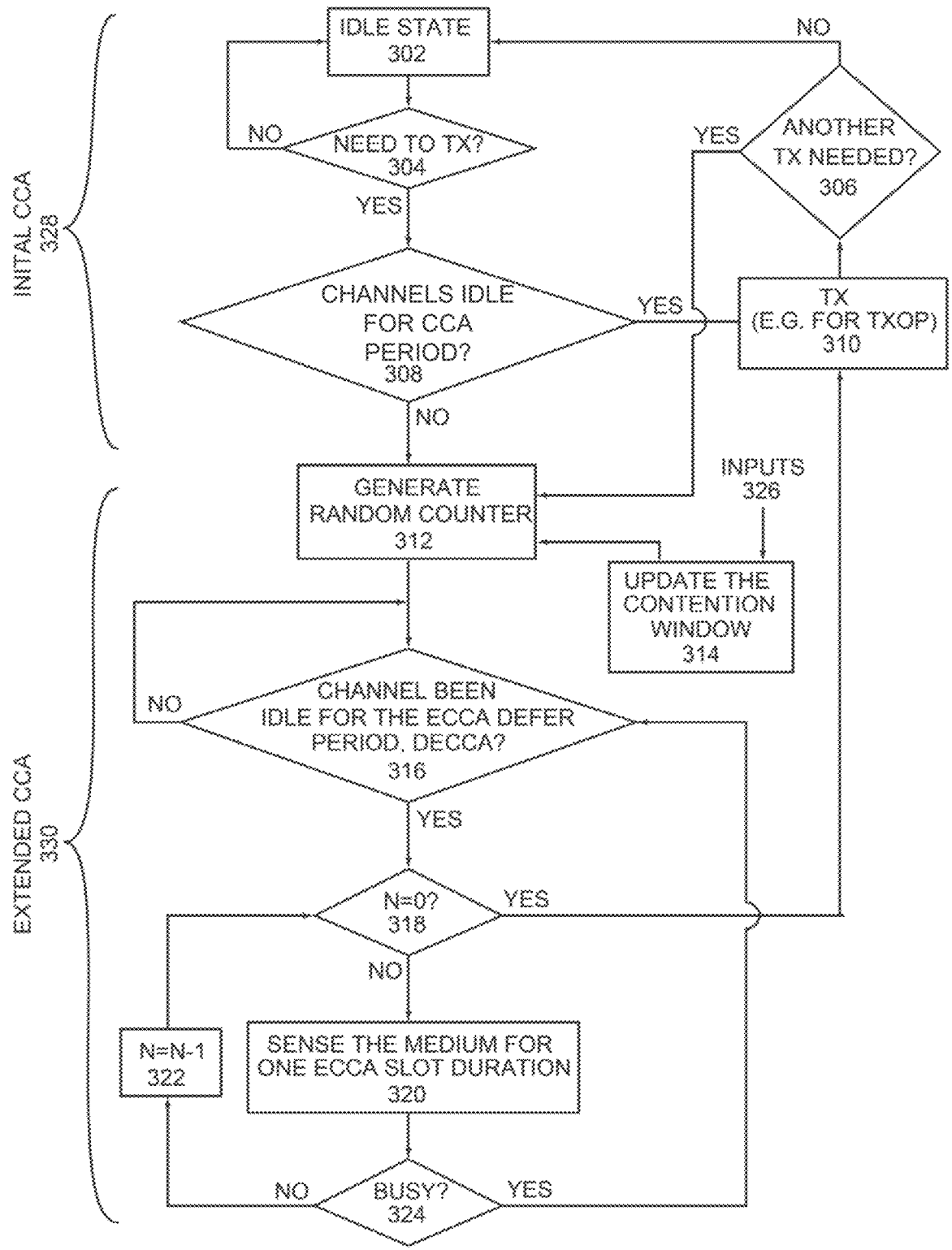
FIG. 3 is a flowchart illustrating an example method for multi-carrier listen before talk that may be used with some example embodiments.

FIG. 3 describes one possible embodiment of LBT operation for LAA or standalone LTE-U systems. Like FIG. 2 above, FIG. 3 may be performed by either an eNB or a UE transmitting in a system such as the wireless network system 100. In operation 302, a device is in an idle state, and in operation 304 the device checks for transmissions. If transmissions are pending, in operation 308, a channel idle list is checked to determine if the unlicensed channels in a channel idle list are clear for a CCA (e.g., LBT) period (e.g., 34 µs). If so, the device transmits in operation 310 and then determines if additional transmissions are needed from the device in operation 306. If no additional transmissions are needed, then the device returns to the idle state in operation 302. If any other transmission is needed after operation 306 or if the channels are not idle for the CCA period in operation 308, then initial CCA operations 328 end, and extended CCA 330 begins.

In operation 312, a random counter is generated as described above at times 228 and 230 of FIG. 3. Inputs 326 such as acknowledgements or negative acknowledgements received by the device may be processed and used to update details of the channels during operation 314. This may influence the generation of the random counter in operation 312. In some embodiments, operation 314 involves selection of a set Q of possible counter values between an initial value of X and a final value of Y, such that the random counter generated in operation 312 is a random value selected from the set Q. Inputs 326 may update the X and Y values to adjust the possible counters in the set Q. For example, in one embodiment Q may include the values 3, 4, 5, 6, and 7, where X is 3 and Y is 7. In other embodiment Q may include the values 15 to 1023, where X is 15 and Y is 1023. If Y is adjusted to 5 based on an input 326, then Q is 3, 4, and 5, and after the input the random value will be selected from the new set Q of 3, 4, or 5. In other embodiments, other sets may be used for the possible values of the random counter used for any listen before talk or back-off duration that is random. As referred to herein, a random value is any random or pseudorandom value selected using a computer or device implemented randomization process. The inputs 326 may be based on various types of system feedback. For example, if errors in transmission are received, a larger back-off period may be used, whereas an absence of errors may result in a smaller back-off period. Similarly, a history of recent use by coexisting other devices may be used to select a wider range of back-off operations to enable more generous coexistence and fewer errors from aggressive use of the unlicensed channels.

In operation 316, the device checks to see if a channel is idle during an extended deferral period, or extended CCA (ECCA or DECCA). If not, the device waits until the channel is clear. When the channel is clear, a countdown and channel sense loop begins to count down from the random counter selected in operation 312. In operation 320 the channel is sensed, and if it is determined to be busy in operation 324, the deferral period of operation 316 is restarted. If the channel is not busy in operation 324, the counter decrements in operation 322. This process repeats until the counter is identified as zero in operation 318, at which point the device transmits on the channel in operation 310, and the procedure repeats from an idle state or an expected follow-up transmission. The embodiment of FIG. 3 includes independent asynchronous LBT on all component carriers, and so this process is used independently for each unlicensed component carrier in a system. Unlike the process described for FIG. 2, this results in unaligned transmissions between unlicensed component carriers, and can significantly hurt the performance of other devices in the system by using different channels at unpredictable and unrelated periods. For WiFi systems competing for multiple channels, if WiFi occupies the secondary carrier after sensing the primary channel, then as the UE or eNB LAA process independently performs LBT on the secondary carrier, very likely, the secondary channel is occupied by the LAA communications. In particular, the amount of time available for grabbing the secondary channel for WiFi equals the small window over which LAA is performing CCA. The probability that the WiFi system can grab the secondary channel is also conditioned on the primary channel success at the exact window, making it almost infeasible for WiFi to grab the secondary channel. Such a system for eNB and UE communications thus provides poor coexistence with WiFi devices. By contrast, various embodiments of the system operation in FIG. 2 allow aligned usage of multiple unlicensed component carriers in ways that allow a WiFi system to grab a secondary channel (e.g., the channel associated with the carrier 206) in addition to a primary channel (e.g., the channel associated with the carrier 204.)

In one embodiment, a device for LAA transmission on multiple unlicensed channels performs LBT on only one of the component carriers. This one component carrier is referred as the primary carrier out of the available component carriers C. The selection of the primary carrier can be random for every data burst or fixed semi-statically, or can correspond to the primary channel of coexisting WiFi systems. The primary component carrier completes the LBT described in FIG. 3. A CCA check is conducted on all remaining carriers just before completion of the LBT on the fixed selected carrier. In some embodiments, the CCA check on the primary carrier may be implemented as an extension of the LBT, rather than a separate CCA check, such that the CCA check includes a separate CCA check of the non-primary channels and the end of the LBT on the primary channel. In one of the embodiments the CCA check can be performed for 25 µs. As additional embodiment, for updating the contention window Q, negative acknowledgements on all or subset of the component carrier used for transmission of the data burst can be used.

Figure 4:
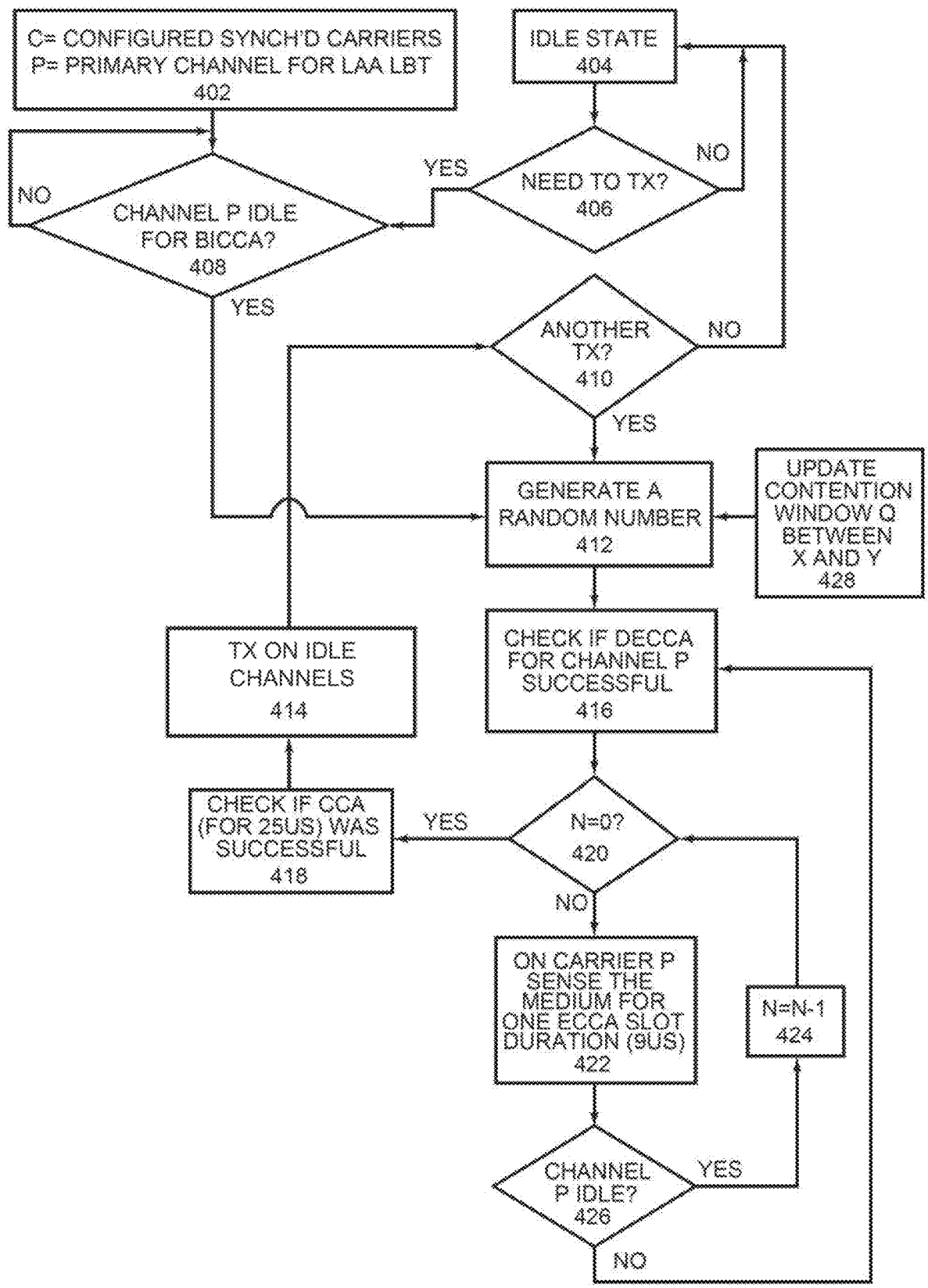
FIG. 4 is a flowchart illustrating aspects of multi-carrier listen before talk, according to some example embodiments.

Thus, in one embodiment, a single primary carrier is associated with the operations of FIG. 3, and the remaining component carriers are associated with the operations of FIG. 4. Thus, as illustrated by FIG. 4, the remaining component carriers begin with a primary channel P selected in operation 402 and configured for performing independent LBT with a corresponding back-off counter and self-deferral period. The remaining carriers wait for a channel sensing operation following the self-deferral period. All channels begin as idle in operation 404. If the component carriers are needed for transmission in operation 406, the device checks for an initial idle state of the primary channel and waits for this idle state in operation 408 during an initial CAA period (BiCCA). At operation 410, the system determines if a follow up transmission is to be made after an initial transmission. If not, then the system remains in idle state 404. If a follow up transmission is to be made, a random number is then generated in operation 412 based on an updated contention window from operation 428. The LBT process for the primary channel then uses a countdown channel sensing loop in operations 420, 422, 426, and 424. If activity is sensed on channel P in operation 426 before the countdown reaches zero, then the LBT/DECCA operation repeats waiting for the primary channel to be idle. If the primary channel remains idle until the countdown reaches zero, then for each non-primary channel, a CCA is performed in operation 418. After the CCA check, only idle carriers are used for transmission in operation 414. If another transmission is needed, then the process repeats to generate a random number in operation 412. A contiguous component carrier constraint can be imposed on the carrier selection for transmitting the data burst (after LBT is purposed on the carriers other than the primary carriers) in some embodiments.

Figure 5:
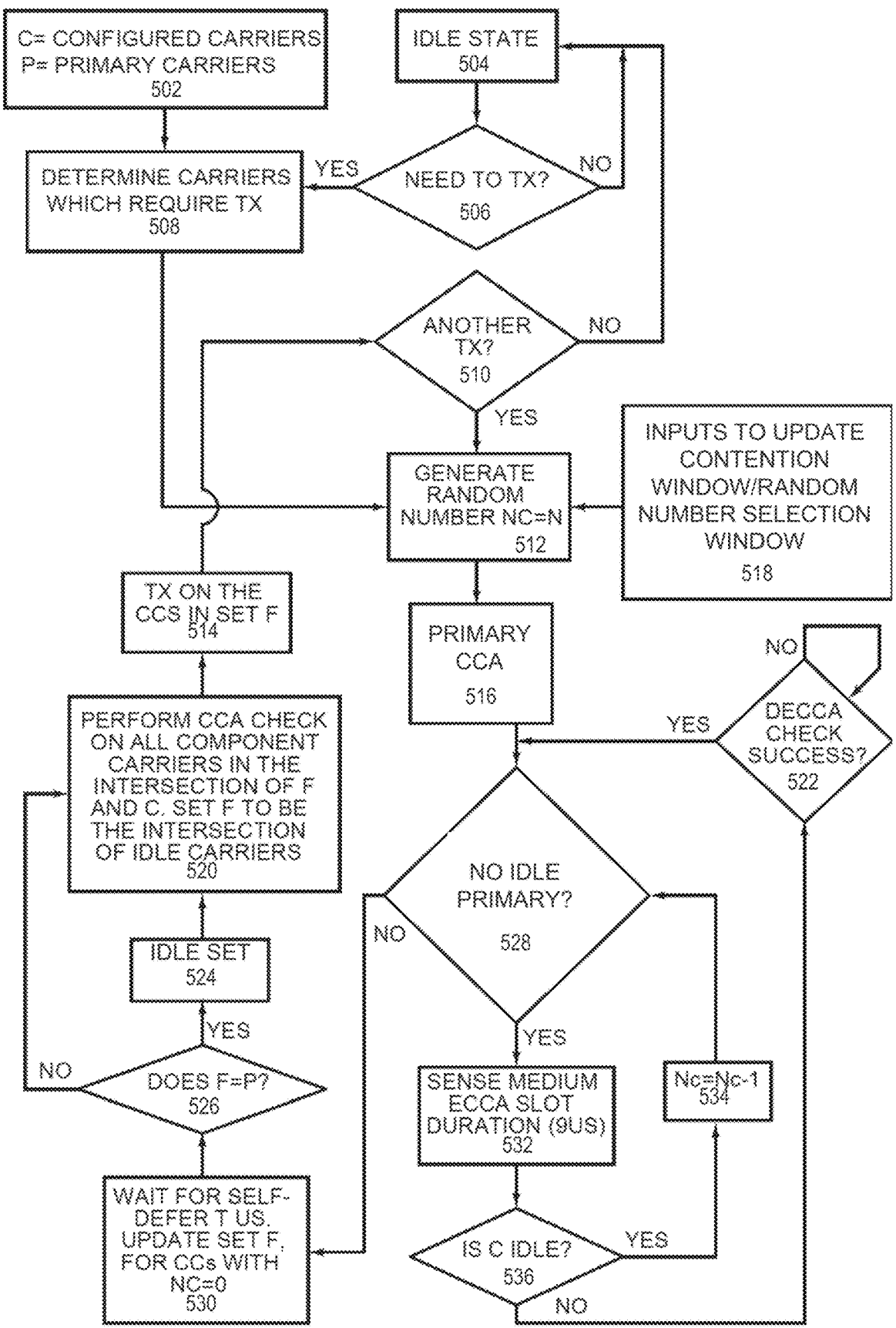
FIG. 5 is a flowchart illustrating a method of multi-carrier listen before talk, according to some example embodiments.

FIG. 5 illustrates aspects of another embodiment. In this embodiment, an LAA device performs LBT on a subset of component carriers, where the subset includes more than one component carrier. In other words, more than one primary carrier is used, but possibly not all of the component carriers are primary component carriers. The subset of primary carriers may be fixed semi-statically from the available component carriers as part of an operation 502. The system then begins with carriers in an idle state at operation 504, transitioning into a need to transmit being identified in operation 506, followed by a determination of which carriers are to be used for transmission in operation 508. In operation 512, the LAA operation generates a single random number N from [0, q−1], where q is configured a priori or adaptively calculated based on an updated contention. Q may be based on channel errors, acknowledgements, negative acknowledgements, history data for the channel, or any other such information from operation 518. As one embodiment, contention windows for all primary component carriers are updated independently based on the negative acknowledgements, while the common contention window Q can be the maximum of all the contention windows associated with the all primary carriers. The primary carriers then perform an independent LBT operation as described in FIG. 3, but using the single back-off counter. After the primary LBT/CCA occurs in operation 516, the system checks to see if none of the primary carriers are idle in operation 528. If none of the primary carriers are idle, then sensing is performed in operations 532 and 536, with an extended CCA (DECCA) check operation 522 for non-idle primary carriers while the system waits for a first idle primary channel. Once an idle primary channel is identified from the plurality of primary channels in operation 528, then a self-deferral period occurs in operation 530. During the self-deferral period of operation 530 (taking Tµs), each primary carrier continues to check an idle status using operations 532,536, 534, and 522. Any primary channel not idle during an iteration of operation for that channel resets the countdown for that channel, and proceeds through a loop, decrementing the counter for that channel in operation 534 when the channel is idle. Thus, a primary channel can be deemed as idle as long as the counter reaches zero before the end of the self-deferral period, even if it is sensed as non-idle. Operations 526, 524 and 520 then determine which carriers to use for transmission at the transmission operation 514. If the remaining primary component carriers do not complete LBT before the completion of the self-deferral period as mentioned above, only the primary carriers that have completed the LBT are used for transmission. If the LBT on all primary carriers is completed before the self-deferral period (e.g., Tµs), a CCA check (e.g., 25 µs duration) is performed on all component carriers which are selected for transmissions, just before completion of the LBT of all the primary component carriers. In some embodiments, the channel sensing period is considered the period just before the end of the LBT for the primary carriers. After the CCA check on the non-primary carriers, only idle carriers (e.g., carriers in the set of idle non-primary carriers and primary carriers that completed LBT before the end of self-deferral period) are used for transmission. The process then either returns to an idle state or repeats if additional transmissions are to be made.

Figure 6:
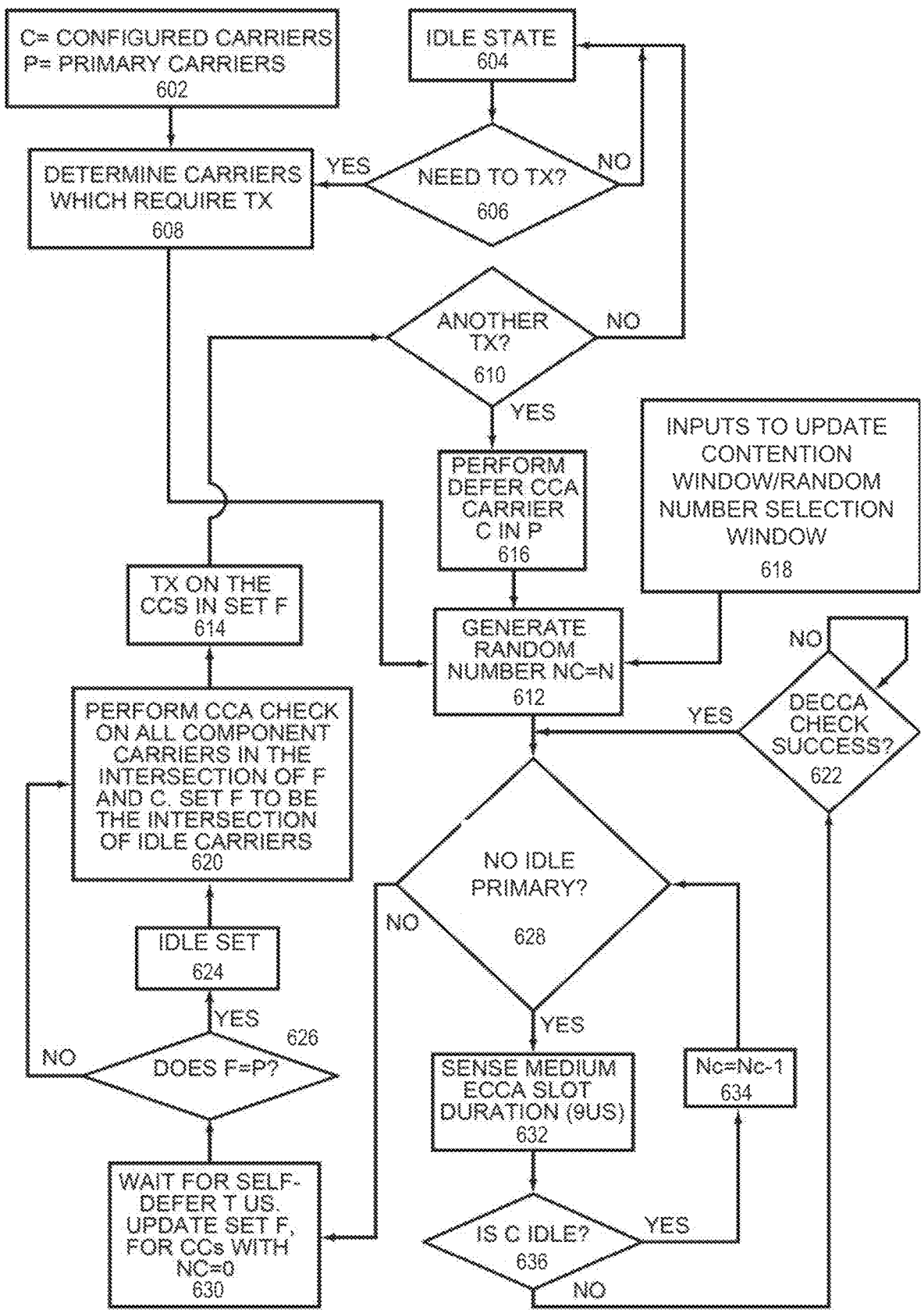
FIG. 6 is a flowchart illustrating aspects of multi-carrier listen before talk, according to some example embodiments.

FIG. 6 illustrates an additional embodiment of multi-carrier listen before talk. In the embodiment of FIG. 6, LAA operations of a device only perform independent LBT operations on a subset of the component carriers (referred to as primary carriers) selected from the total number of available component carriers. The selection of the primary carriers can be random or fixed semi-statically. The primary carriers can correspond to the primary and secondary channels of WiFi systems in some embodiments. Each of the plurality of primary carriers in such an embodiment independently perform LBT/CCA procedures as described in FIG. 3. In this embodiment, an LAA system of a device generates an independent random number from zero to qc−1 for each component carrier, where qc is the contention window parameter for the corresponding component carrier. A self-deferral period is defined, after one of the primary component carriers completes LBT. If the remaining primary component carriers do not complete LBT before the completion of the self-deferral period, only the primary carriers which have completed the LBT process are used for transmission. If the LBT on all primary carriers is completed before the self-deferral, a CCA check (e.g., 25 µs) is performed on all of the component carriers just before completion of the LBT on all of the primary component carriers. After this check, all idle carriers are used for transmission, which includes primary carriers idle during the LBT period and all carriers idle during the CCA check. In the embodiment of FIG. 6, the operations are similar to the operations of FIG. 5, except that the independent random number is independent for each primary carrier. Thus, the idle state in operation 604 following the configuration in operation 602 leads to transmission determinations in operations and. The independent number generation occurs in operation 612 using inputs from operation. The system waits for an idle primary carrier during the loops of operations 628, 632, 636, 634 and 622. After at least one idle primary is identified in operation, then a self-deferral period taking T microseconds occurs. At the end of this period, non-primary channels perform a channel sensing to determine if they are idle. All idle channels determined in operations 626, 624 and 620 (e.g., the set of channels F) are used for transmission in operation 614. If additional transmissions are to be made (operation 610), then the process repeats with an initial deferral or back-off CCA in operation 616. If no additional transmissions are to be made, all channels return to an idle state.

Figure 7:
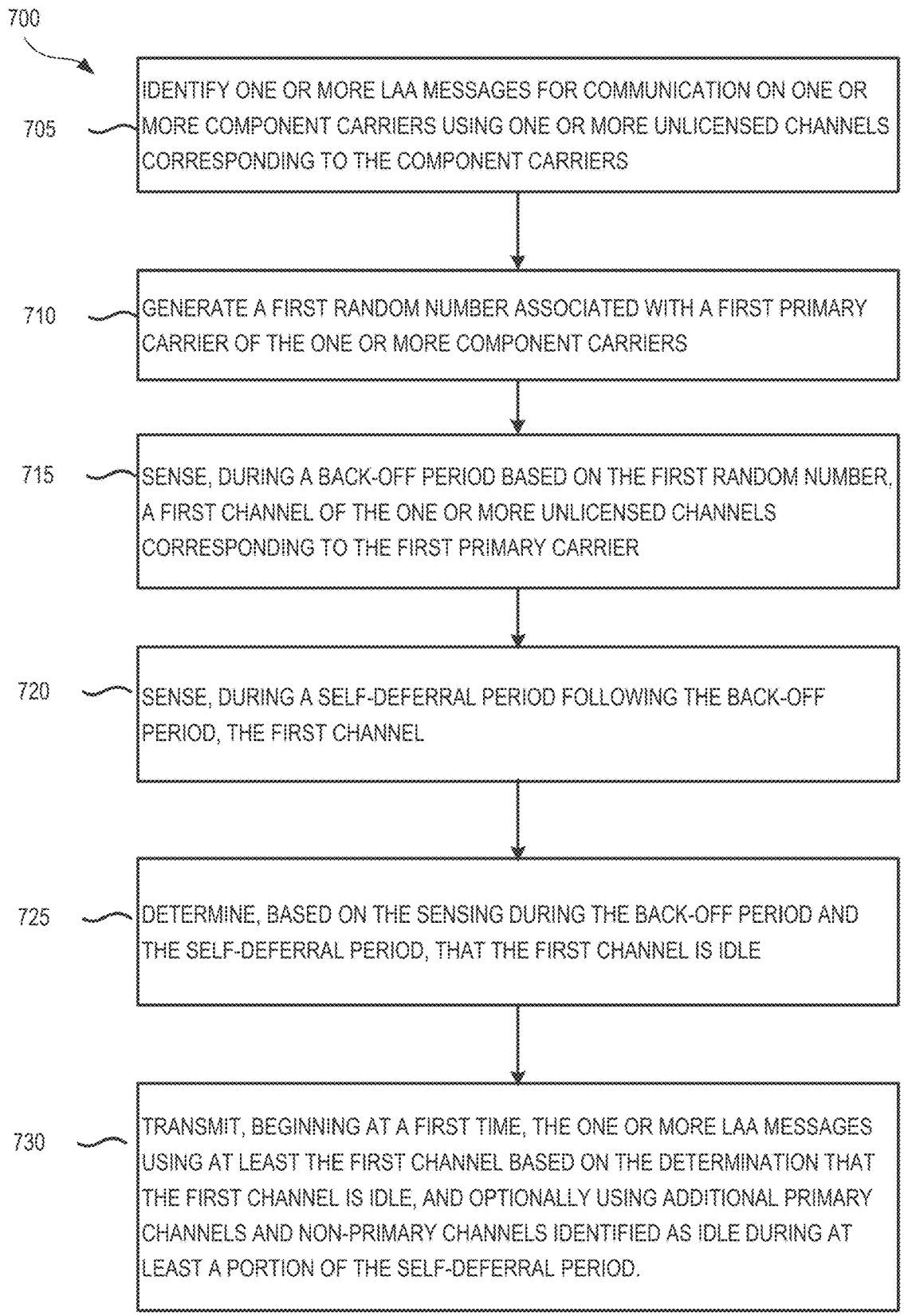
FIG. 7 is a flowchart illustrating a method of multi-carrier listen before talk, according to some example embodiments.

FIG. 7 then illustrates an example method 700 that operates according to one embodiment. The method 700 is performed by either a UE or an eNB having one or more processors and a memory. In various other embodiments, circuitry of the device may be configured to implement operations corresponding to the operations of method 700, or instructions stored in the memory of the device may configure circuitry of the device to perform such operations as the device is configured for license-assisted access (LAA) or LTE-U communications between a UE and an eNB.

The illustrated method 700 begins with operation 705 where the device is configured to identify one or more LAA (or LTE-U) messages for communication on one or more component carriers using one or more unlicensed channels corresponding to the component carriers.

The system then performs an extended listen before talk operation to allow multiple carriers to transmit at once in an aligned fashion. Transmission may occur with only one carrier, but the operations attempt to identify multiple carriers and to begin transmission on the multiple carriers at nearly the same time, as illustrated in FIG. 2. To verify the back-off period, operation 710 involves generation of a first random number associated with a first primary carrier of the one or more component carriers, and then operation 715 involves sensing, during a back-off period based on the first random number, a first channel of the one or more unlicensed channels corresponding to the first primary carrier. As described above, in systems with multiple primary carriers, the random number may be shared, or each primary carrier may have an independent back-off counter. When at the first primary carrier reaches the end of its corresponding back-off period, a self-deferral period begins in operation 720 to allow any other channels to achieve an idle state and align transmissions with the first primary carrier. In operation 720, all channels for the system are sensed. This includes an operation to sense, during the self-deferral period following the back-off period, the first channel. If none of the primary channels are idle, the transmission does not proceed until at least the first primary channel is idle and available for transmission. At operation 725, a determination is made, based on the sensing during the back-off period and the self-deferral period, that the first channel is idle and therefore available for transmission. In operation 730, the device transmits the one or more LAA messages using the first channel based on the determination that the first channel is idle. If other primary channels or non-primary channels are identified as idle during the self-deferral period, those channels are also used to transmit the one or more LAA messages during the same transmission time used to transmit on the first primary channel. The above is one example embodiment of a method. Various additional embodiments are described below.

Examples

In various embodiments, methods, apparatus, media, computer program products, or other implementations may be presented as example embodiments in accordance with the descriptions provided above. Certain embodiments may include UEs such as phones, tablets, mobile computers, or other such devices. Some embodiments may be integrated circuit components of such devices, such as circuits implementing MAC and/or L1 processing in integrated circuitry. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to evolved node B embodiments described herein.

Example 1 is a computer readable medium comprising instructions that, when executed by one or more processors, configure an evolved node B (eNB) for license-assisted access communications, the instructions to configure the eNB to: determine, by the eNB, that a first channel is idle based on a sensing of the first channel for a first period of time; initiate, based on the determination that the first channel is idle, a reservation signal on the first channel for a second period of time following the first period of time; initiate transmission of an uplink grant to a first user equipment (UE), the uplink grant associated with the first channel and a third period of time following the second period of time; and sense, by the eNB, the first channel during the third period of time to detect a physical uplink shared channel (PUSCH) transmission associated with the uplink grant.

In Example 2, the subject matter of Example 1 optionally includes wherein the second period of time is separated from the third period of time by a UE sensing period such that the first UE senses the first channel during the UE sensing period following transmission of the reservation signal to determine that the first channel is idle during the UE sensing period.

In Example 3, the subject matter of any one or more of Examples 1 optionally includes wherein the third period of time immediately follows the second period of time; and wherein the UE is configured to communicate the PUSCH transmission on the first channel during the third period of time without performing a listen-before-talk (LBT) operation.

In Example 4, the subject matter of any one or more of Examples 1-3 optionally includes wherein the uplink grant is communicated from the eNB to the first UE on a second channel different from the first channel as part of a physical downlink control channel (PDCCH) transmission.

In Example 5, the subject matter of any one or more of Examples 1-4 optionally includes wherein the reservation signal comprises one or more of a PDCCH, a physical downlink shared channel (PDSCH), and a demodulation reference signal (DRS).

In Example 6, the subject matter of any one or more of Examples 1-5 optionally includes where the reservation signal comprises a primary synchronization signal (PSS) and a secondary synchronization signal (SSS).

In Example 7, the subject matter of any one or more of Examples 1-6 optionally includes wherein the instructions further configure the eNB to: receive a plurality of scheduling requests from a plurality of UEs, the plurality of UEs comprising the first UE; and wherein initiating transmission of the uplink grant to the first UE comprises initiating transmission of the uplink grant to each UE of the plurality of UEs.

In Example 8, the subject matter of Example 7 optionally includes wherein the instructions further configure the eNB to assign a first license-assisted access radio network temporary identifier to each UE of the plurality of UEs, wherein the license-assisted access radio network temporary identifier is separate from a cell radio network temporary identifier (C-RNTI) for each UE of the plurality of UEs; and wherein the transmission of the uplink grant to each UE of the plurality of UEs uses the first license-assisted access radio network temporary identifier such that the plurality of UEs receives the uplink grant using a same identifier.

In Example 9, the subject matter of examples 1-8 above includes embodiments wherein each UE of the plurality of UEs performs an LBT operation after receiving the uplink grant; and wherein the first UE completes a successful carrier sensing operation and reserves the first channel with a second reservation signal prior to each other UE of the plurality of UEs. Such embodiments can operate wherein the second reservation signal comprises a first C-RNTI for the first UE.

In Example 10, the subject matter of any one or more of Examples 1-9 optionally includes wherein the instructions further configure the eNB to: successfully decode the PUSCH transmission associated with the uplink grant; and transmit a synchronous hybrid automatic repeat request associated with the PUSCH transmission to the first UE.

In Example 11, the subject matter of any one or more of Examples 1-10 optionally includes wherein the instructions further configure the eNB to: determine that the eNB has failed to identify the PUSCH transmission on the first channel during the third period of time; and transmit an asynchronous hybrid automatic repeat request from the eNB to the first UE in response to the failure to identify the PUSCH transmission.

In Example 12, the subject matter of Example 11 optionally includes wherein the uplink grant comprises a transmission grant associated with the third period of time and a retransmission grant associated with a fourth period of time following the second period of time.

In Example 13, the subject matter of Example 12 optionally includes wherein a number of physical resource blocks for the uplink grant are adjusted dynamically by the eNB between the third period of time and the fourth period of time.

In Example 14, the subject matter of any one or more of Examples 12-13 optionally includes wherein a modulation and coding scheme associated with the uplink grant is set dynamically by the eNB based on the sensing of the first channel for the first period of time and the failure to identify the PUSCH transmission.

Example 15 is an apparatus of an evolved node B (eNB) comprising control circuitry configured to: determine that a first channel is idle based on a sensing of the first channel for a first period of time; initiate, based on the determination that the first channel is idle, a reservation signal on the first channel for a second period of time following the first period of time; initiate transmission of an uplink grant to a first user equipment (UE), the uplink grant associated with the first channel and a third period of time following the second period of time; initiate sensing of the first channel during the third period of time to detect a PUSCH transmission associated with the uplink grant; and generate a hybrid automatic repeat request for transmission to the first UE in response to the sensing of the first channel.

In Example 16, the subject matter of Example 15 optionally includes further comprising: receive circuitry coupled to the control circuitry and configured to sense the first channel during the first period of time and the second period of time and to receive the PUSCH transmission; and transmit circuitry coupled to the control circuitry and configured to transmit the reservation signal to the first UE on the first channel.

In Example 17, the subject matter of any one or more of Examples 15-16 optionally includes wherein the receive circuitry and the transmit circuitry are coupled to a first antenna; wherein the first antenna is configured for communications on the first channel comprising an unlicensed channel; and wherein the first antenna is further configured for communications on a second channel comprising a licensed channel.

Example 18 is a computer readable medium comprising instructions that, when executed by one or more processors, configure a user equipment (UE) for license-assisted access communication with an evolved node B (eNB), the instructions to configure the UE to: receive, from the eNB, an uplink grant associated with a first unlicensed channel and a first period of time; determine that the first unlicensed channel is available for a PUSCH transmission during the first period of time; transmit the PUSCH transmission to the eNB during the first period of time; and receive a hybrid automatic repeat request associated with the PUSCH transmission from the eNB.

In Example 19, the subject matter of Example 18 optionally includes wherein the UE determines that the first unlicensed channel is available for the PUSCH transmission based on receipt of a reservation signal transmitted from the eNB.

In Example 20, the subject matter of any one or more of Examples 18-19 optionally includes wherein the UE determines that the first unlicensed channel is available for the PUSCH transmission based on a listen before talk operation performed by the UE.

Example 21 is an apparatus of a user equipment (UE) configured for license-assisted access communications with an evolved node B (eNB), the UE comprising: receive circuitry configured to receive, from the eNB, an uplink grant associated with a first unlicensed channel for a PUSCH transmission, and to receive an asynchronous hybrid automatic repeat request associated with the PUSCH transmission; control circuitry configured to determine that the first unlicensed channel is available for the PUSCH transmission; and transmit circuitry configured to transmit the PUSCH transmission to the eNB in response to the control circuitry determining that the first unlicensed channel is available for the PUSCH transmission.

In Example 22, the subject matter of Example 21 optionally includes wherein the control circuitry is configured to determine that the first unlicensed channel is available for the PUSCH transmission by: decoding the uplink grant to identify a first license-assisted access radio network temporary identifier associated with a plurality of UEs; processing carrier sensing data from the receive circuitry to determine that the first unlicensed channel meets a set of availability criteria and that each other UE of the plurality of UEs has not sent a prior reservation signal; and initiating transmission, using the transmit circuitry, of a first UE reservation signal, the first UE reservation signal comprising a first C-RNTI for the UE.

Example 23 is a method of uplink scheduling for wireless communication systems, comprising: an eNB and UEs capable of performing listen-before-talk (LBT) with extended CCA mechanism, wherein i) the eNB and UEs can sense a channel to determine if the channel is busy or idle, and transmit after a random duration specified within a given interval; and ii) the eNB and UEs can reserve the channel for a specific duration by sending data, reference signals, or any other known possible signal.

Example 24 is the method of example 23 wherein the eNB can schedule the UEs using an existing PDCCH mechanism and allocate resources for an uplink subframe in unlicensed bands.

Example 25 is the method of examples 23-24 wherein the eNB senses the channel, reserves the channel with a reservation signal, and transmits uplink grants to the UEs, and the UEs transmit PUSCH on the scheduled subframe without sensing the channel.

Example 26 is the method of examples 23-24 wherein the eNB senses the channel, reserves the channel with a reservation signal, and transmits uplink grants to the UEs, and the UEs transmit PUSCH on the scheduled subframe after sensing the channel. If the channel is not idle, the UEs do not transmit.

Example 27 is the method of examples 23-26, wherein uplink grants are transmitted to the UEs on licensed bands via cross-carrier scheduling (without sensing the channel), and the UEs transmit PUSCH on the scheduled subframe only when the channel is sensed idle.

Example 28 is the method of examples 23-27 wherein the reservation signal can be DL transmissions, e.g., (e)PDCCH, PDSCH, DRS, and PSS/SSS.

Example 29 is the method of examples 23-28 wherein the eNB should not transmit anything on an unlicensed carrier for a certain time duration during which a scheduled UE can sense the channel.

Example 30 is the method of examples 23-29 wherein a new DCI can be defined for scheduling multiple subframes for a UE with a single uplink grant. The DCI format can include C-RNTI of the UE and a number of maximum subframes the UE is allowed to transmit.

Example 31 is the method of examples 23-30 wherein the eNB may send an uplink grant for a specific subframe to a group of UEs which requested scheduling.

Example 32 is the method of examples 23-31 wherein a new RNTI can be defined and used by the eNB instead of C-RNTI when a cyclic redundancy check (CRC) is attached to a DCI message payload, so that a group of UEs assigned the same value can receive PDCCH.

Example 33 is the method of examples 23-32 wherein upon receiving an uplink grant from the eNB, the group of UEs performs LBT. The first UE with successful carrier sensing can reserve the channel with a reservation signal until the start of the scheduled subframe and then transmit data on PUSCH.

Example 34 is the method of examples 23-33 wherein the reservation signal can include the UE's C-RNTI, modulation coding scheme (MCS), etc.

Example 35 is the method of examples 23-34 wherein both the eNB and the UE perform LBT independently with their own LBT parameters.

Example 36 is the method, medium, or device of any embodiment above wherein flexible asynchronous hybrid automatic repeat request (HARQ). operation is used.

Example 37 is the method, device, or medium of any embodiment above wherein the eNB can send an uplink grant for each uplink transmission (including initial transmission and retransmission) in unlicensed bands for asynchronous HARQ operation.

Example 38 is the method of any embodiment above wherein the eNB can dynamically change parameters, e.g., the number of physical resource blocks (PRBs) and MCS.

Example 39 is the method of any embodiment above wherein the eNB performs a blind detection, for instance, an energy detection or any form of detection, for the scheduled PUSCH resources.

In any of the embodiments, above, the system may operate using component carriers in a licensed spectrum along with the one or more component carriers in an unlicensed spectrum. Other embodiments may operate using only unlicensed component carriers.

Example 40 is the method of any embodiment above involving communication of a portion of the one or more LAA messages between the eNB and UE using one or more licensed channels along and during the same time period as the use of the unlicensed channels.

Example 41 is the method of any embodiment above wherein the one or more LAA message are communicated between a UE and an eNB using only unlicensed channels without a licensed channel used to manage LBT on the one or more unlicensed channels.

Further, in various embodiments using feedback systems, contention windows defining the allowable range for random numbers for each channel may either be set together, or separately for each unlicensed channel, or for each primary unlicensed channel.

Example 42 is a user equipment (UE) configured for multi-carrier operation for license-assisted access (LAA) with an evolved node B (eNB), the UE comprising baseband circuitry configured to: identify one or more LAA messages for communication on one or more component carriers using one or more unlicensed channels corresponding to the component carriers; access a negative acknowledgement history associated with the one or more unlicensed channels; adjust a first contention window base on the negative acknowledgement history; generate a first random number associated with a first primary carrier of the one or more component carriers using the contention window; sense, during a back-off period based on the first random number, a first channel of the one or more unlicensed channels corresponding to the first primary carrier; sense, during a self-deferral period following the back-off period, the first channel; determine, based on the sensing during the back-off period and the self-deferral period, that the first channel is idle; and initiate transmission of the one or more LAA messages using the first channel based on the determination that the first channel is idle.

Example 43 is an embodiment of example 42 further comprising application circuitry configured to generate the one or more LAA messages.

Example 44 is an embodiment of examples 42-43 wherein the first contention window defines allowable back-off periods for a plurality of unlicensed channels.

Example 43 is an embodiment of examples 42-43 UE of claims 25-26 wherein the baseband circuitry is further configured to: adjust a second contention window base on a second portion negative acknowledgement history; wherein the first contention window is set only for a first unlicensed channel based on a first portion of the negative acknowledgement history for negative acknowledgements on the first unlicensed channel; and wherein the second contention window different from the first contention window is set for a second unlicensed channel based on the second portion of the negative acknowledgement history for the second unlicensed channel.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing a transmitting device will have an embodiment that receives the transmission, even if such an embodiment is not specifically detailed. Similarly, methods, apparatus examples, and computer readable medium examples may each have a corresponding example of the other type even if such examples for every embodiment are not specifically detailed.

Example Systems and Devices

Figure 8:
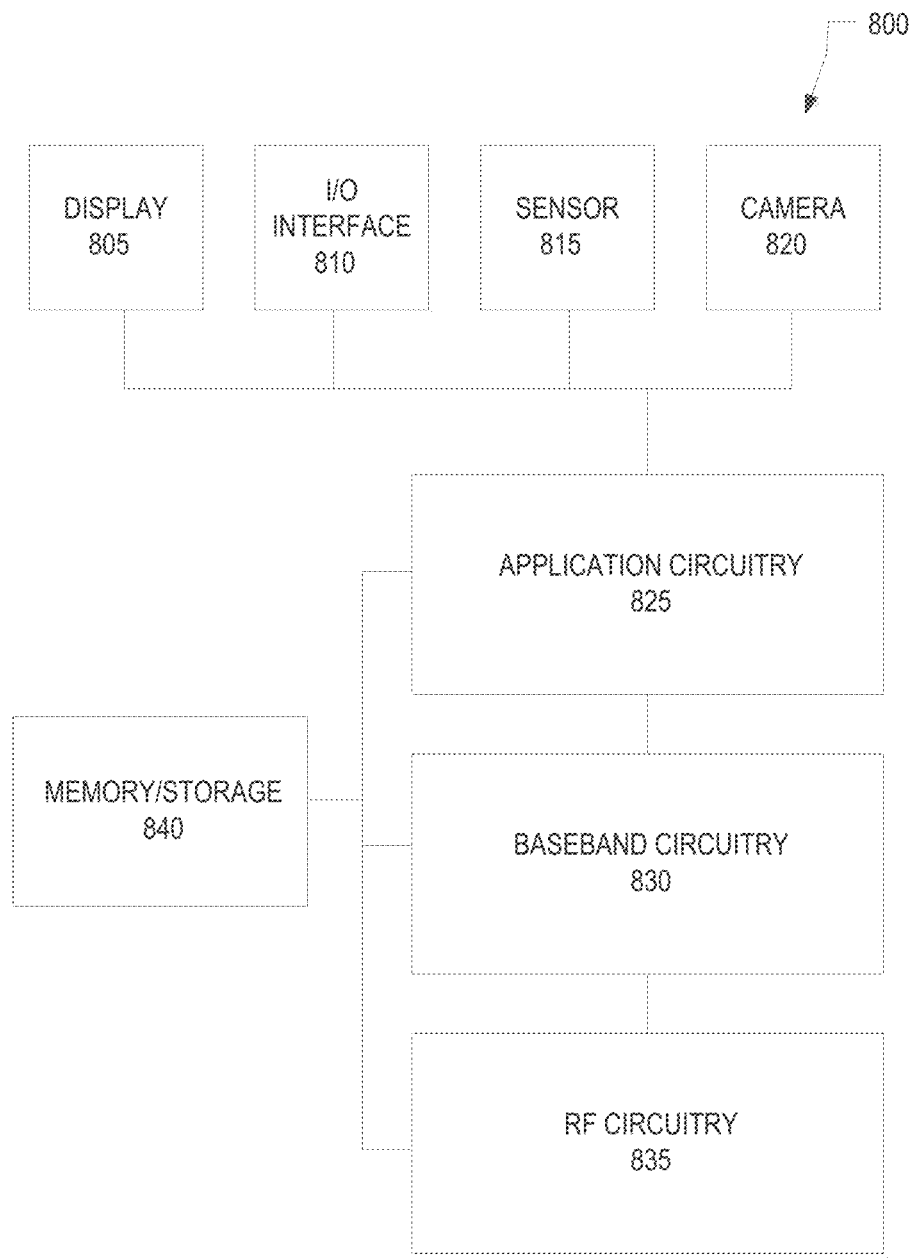
FIG. 8 illustrates aspects of a computing machine, according to some example embodiments.

FIG. 8 illustrates aspects of a computing machine according to some example embodiments. Embodiments described herein may be implemented into a system 800 using any suitably configured hardware and/or software. FIG. 8 illustrates, for some embodiments, an example system 800 comprising radio frequency (RF) circuitry 835, baseband circuitry 830, application circuitry 825, memory/storage 840, a display 805, a camera 820, a sensor 815, and an input/output (I/O) interface 810, coupled with each other at least as shown.

The application circuitry 825 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 840 and configured to execute instructions stored in the memory/storage 840 to enable various applications and/or operating systems running on the system 800.

The baseband circuitry 830 may include circuitry such as, but not limited to, one or more single-core or multi-core processors. The processor(s) may include a baseband processor. The baseband circuitry 830 may handle various radio control functions that enable communication with one or more radio networks via the RF circuitry 835. The radio control functions may include, but are not limited to, signal modulation, encoding, decoding, radio frequency shifting, and the like. In some embodiments, the baseband circuitry 830 may provide for communication compatible with one or more radio technologies. For example, in some embodiments, the baseband circuitry 830 may support communication with an evolved universal terrestrial radio access network (EUTRAN), other wireless metropolitan area networks (WMANs), a wireless local area network (WLAN), or a wireless personal area network (WPAN). Embodiments in which the baseband circuitry 830 is configured to support radio communications of more than one wireless protocol may be referred to as multi-mode baseband circuitry.

In various embodiments, the baseband circuitry 830 may include circuitry to operate with signals that are not strictly considered as being in a baseband frequency. For example, in some embodiments, the baseband circuitry 830 may include circuitry to operate with signals having an intermediate frequency, which is between a baseband frequency and a radio frequency.

The RF circuitry 835 may enable communication with wireless networks using modulated electromagnetic radiation through a non-solid medium. In various embodiments, the RF circuitry 835 may include switches, filters, amplifiers, and the like to facilitate the communication with the wireless network.

In various embodiments, the RF circuitry 835 may include circuitry to operate with signals that are not strictly considered as being in a radio frequency. For example, in some embodiments, the RF circuitry 835 may include circuitry to operate with signals having an intermediate frequency, which is between a baseband frequency and a radio frequency.

In various embodiments, the transmitter circuitry or receiver circuitry discussed above with respect to the UE 101 or the eNB 150 may be embodied in whole or in part in one or more of the RF circuitry 835, the baseband circuitry 830, and/or the application circuitry 825.

In some embodiments, some or all of the constituent components of a baseband processor may be used to implement aspects of any embodiment described herein. Such embodiments may be implemented by the baseband circuitry 830, the application circuitry 825, and/or the memory/storage 840 implemented together on a system on a chip (SOC).

The memory/storage 840 may be used to load and store data and/or instructions, for example, for the system 800. The memory/storage 840, in one embodiment, may include any combination of suitable volatile memory (e.g., dynamic random access memory (DRAM)) and/or non-volatile memory (e.g., flash memory).

In various embodiments, the I/O interface 810 may include one or more user interfaces designed to enable user interaction with the system 800 and/or peripheral component interfaces designed to enable peripheral component interaction with the system 800. User interfaces may include, but are not limited to, a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, the sensor 815 may include one or more sensing devices to determine environmental conditions and/or location information related to the system 800. In some embodiments, the sensors 815 may include, but are not limited to, a gyro sensor, an accelerometer, a proximity sensor, an ambient light sensor, and a positioning unit. The positioning unit may also be part of, or interact with, the baseband circuitry 830 and/or RF circuitry 835 to communicate with components of a positioning network (e.g., a global positioning system (GPS) satellite). In various embodiments, the display 805 may include a display (e.g., a liquid crystal display, a touch screen display, etc.).

In various embodiments, the system 800 may be a mobile computing device such as, but not limited to, a laptop computing device, a tablet computing device, a netbook, an ultrabook, a smartphone, and the like. In various embodiments, the system 800 may have more or fewer components, and/or different architectures.

Figure 9:
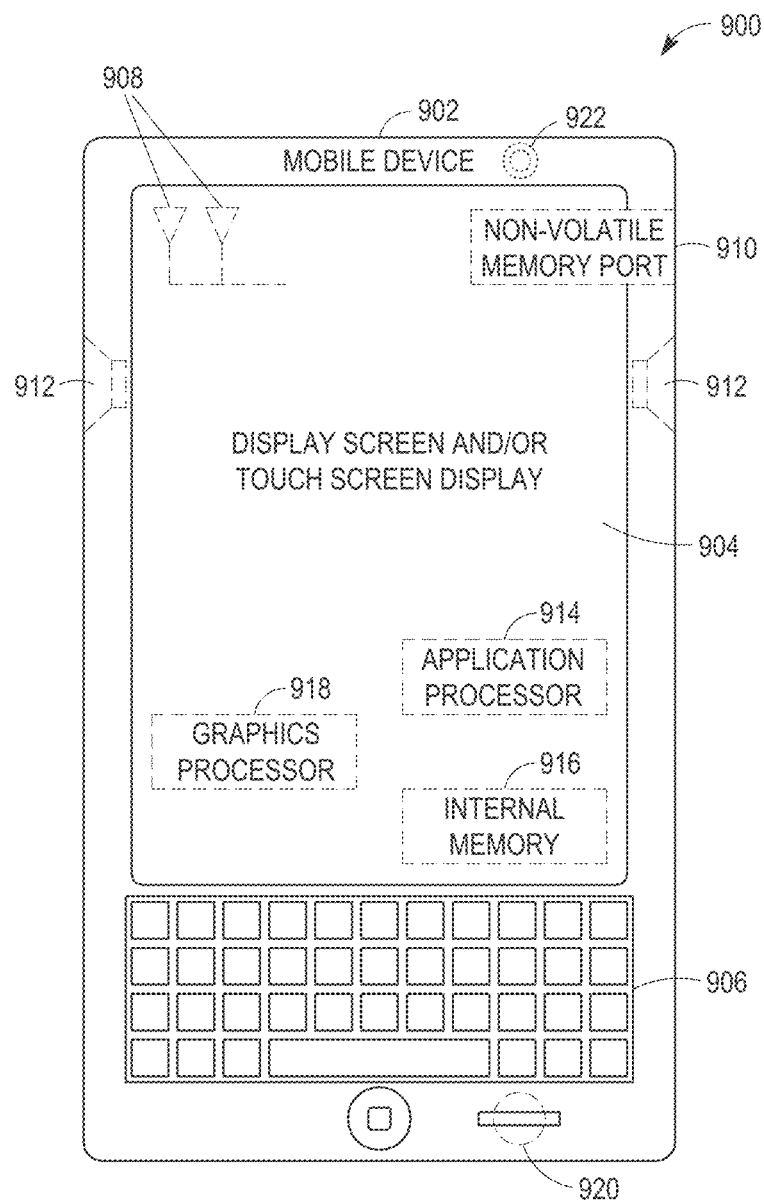
FIG. 9 illustrates aspects of a UE, in accordance with some example embodiments.

FIG. 9 shows an example UE, illustrated as a UE 900. The UE 900 may be an implementation of the UE 101, or any device described herein. The UE 900 can include one or more antennas 908 configured to communicate with a transmission station, such as a base station (BS), an eNB, or another type of wireless wide area network (WWAN) access point. The UE 900 can be configured to communicate using at least one wireless communication standard including 3GPP LTE, WiMAX, High Speed Packet Access (HSPA), Bluetooth, and WiFi. The UE 900 can communicate using separate antennas for each wireless communication standard or shared antennas for multiple wireless communication standards. The UE 900 can communicate in a WLAN, a WPAN, and/or a WWAN.

FIG. 9 also shows a microphone 920 and one or more speakers 912 that can be used for audio input and output to and from the UE 900. A display screen 904 can be a liquid crystal display (LCD) screen, or another type of display screen such as an organic light emitting diode (OLED) display. The display screen 904 can be configured as a touch screen. The touch screen can use capacitive, resistive, or another type of touch screen technology. An application processor 914 and a graphics processor 918 can be coupled to an internal memory 916 to provide processing and display capabilities. A non-volatile memory port 910 can also be used to provide data I/O options to a user. The non-volatile memory port 910 can also be used to expand the memory capabilities of the UE 900. A keyboard 906 can be integrated with the UE 900 or wirelessly connected to the UE 900 to provide additional user input. A virtual keyboard can also be provided using the touch screen. A camera 922 located on the front (display screen) side or the rear side of the UE 900 can also be integrated into a housing 902 of the UE 900.

Figure 10:
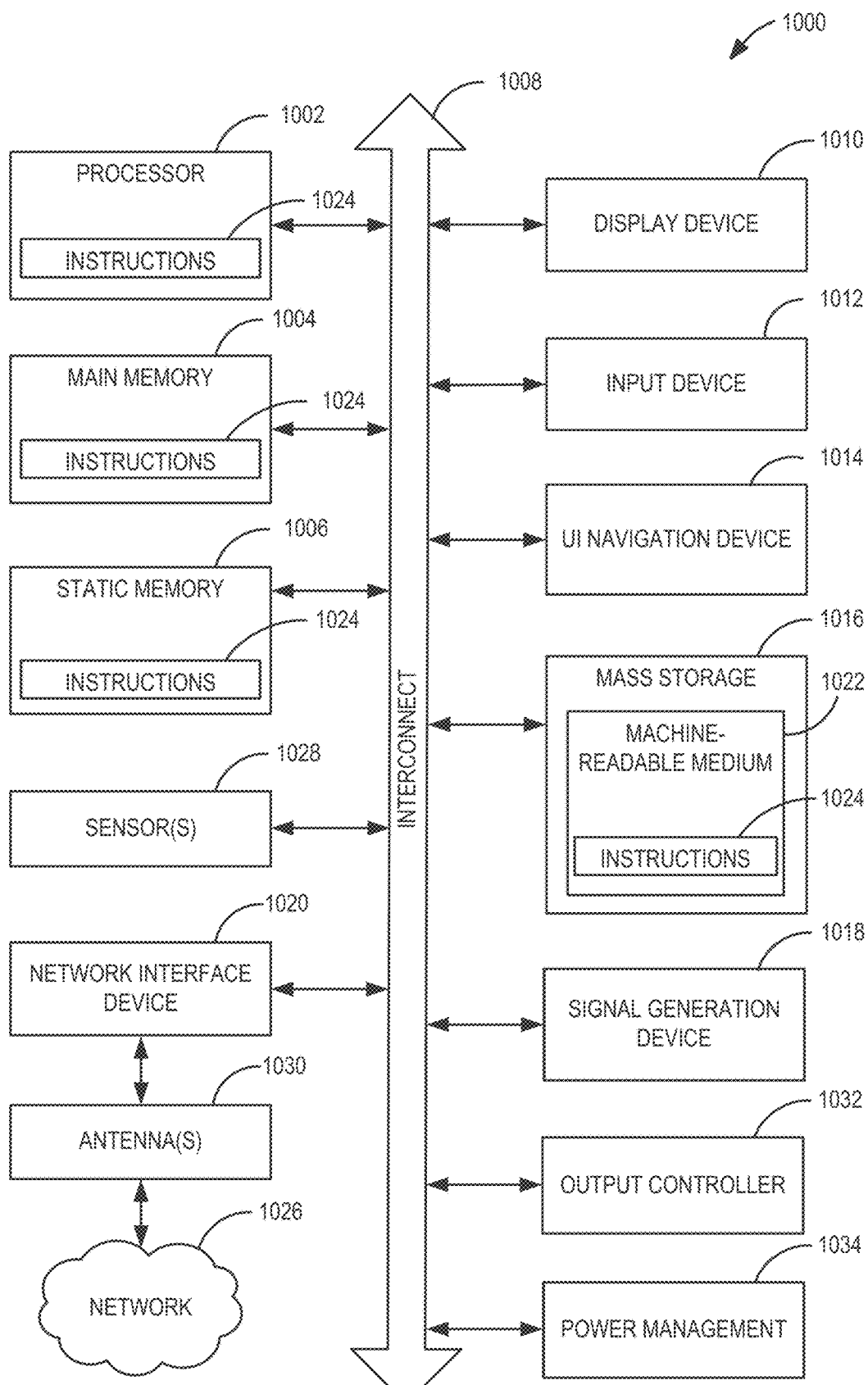
FIG. 10 is a block diagram illustrating an example computer system machine which may be used in association with various embodiments described herein.

FIG. 10 is a block diagram illustrating an example computer system machine 1000 upon which any one or more of the methodologies herein discussed can be run, and which may be used to implement the eNB 150, the UE 101, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 1000 includes a processor 1002 (e.g., a central processing unit (CPU), a graphics processing unit (GPU), or both), a main memory 1004, and a static memory 1006, which communicate with each other via an interconnect 1008 (e.g., a link, a bus, etc.). The computer system machine 1000 can further include a video display device 1010, an alphanumeric input device 1012 (e.g., a keyboard), and a user interface (UI) navigation device 1014 (e.g., a mouse). In one embodiment, the video display unit 1010, alphanumeric input device 1012, and UI navigation device 1014 are a touch screen display. The computer system machine 1000 can additionally include a mass storage device 1016 (e.g., a drive unit), a signal generation device 1018 (e.g., a speaker), an output controller 1032, a power management controller 1034, a network interface device 1020 (which can include or operably communicate with one or more antennas 1030, transceivers, or other wireless communications hardware), and one or more sensors 1028, such as a GPS sensor, compass, location sensor, accelerometer, or other sensor.

The mass storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or processor 1002 during execution thereof by the computer system machine 1000, with the main memory 1004, the static memory 1006, and the processor 1002 also constituting machine-readable media.

While the machine-readable medium 1022 is illustrated in an example embodiment to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 1024 can further be transmitted or received over a communications network 1026 using a transmission medium via the network interface device 1020 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, Erasable Programmable Read-Only Memory (EPROM), flash drive, optical drive, magnetic hard drive, or other medium for storing electronic data. The base station and mobile station or eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 1002.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 1002.16 (e.g., 1002.16p), or Bluetooth (e.g., Bluetooth 9.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

Figure 11:
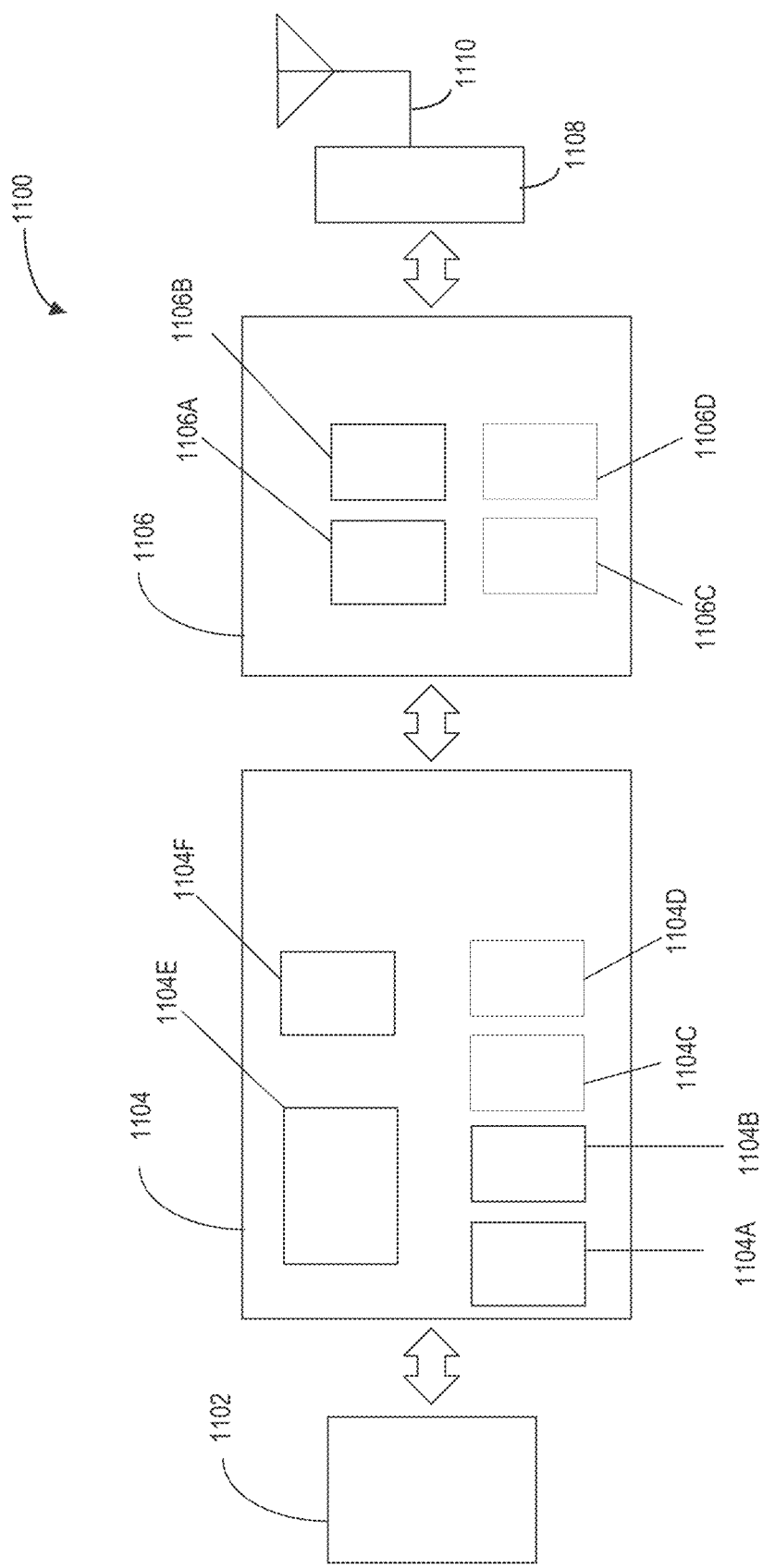
FIG. 11 is a block diagram illustrating an example user equipment including aspects of wireless communication systems, which may be used in association with various embodiments described herein.

FIG. 11 illustrates, for one embodiment, example components of a UE 1100 in accordance with some embodiments. In some embodiments, the UE 1100 may include application circuitry 1102, baseband circuitry 1104, Radio Frequency (RF) circuitry 1106, front-end module (FEM) circuitry 1108, and one or more antennas 1110, coupled together at least as shown. In some embodiments, the UE 1100 may include additional elements such as, for example, memory/storage, a display, a camera, a sensor, and/or an input/output (I/O) interface.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 1100.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. The baseband circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104*a*, third generation (3G) baseband processor 1104*b*, fourth generation (4G) baseband processor 1104*c*, and/or other baseband processor(s) 1104*d* for other existing generations, generations in development, or generations to be developed in the future (e.g., fifth generation (5G), 6G, etc.). The baseband circuitry 1104 (e.g., one or more of the baseband processors 1104*a-d*) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1104e of the baseband circuitry 1104 may be configured to run elements of the protocol stack for signaling of the PHY, MAC, RLC, PDCP, and/or RRC layers. In some embodiments, the baseband circuitry 1104 may include one or more audio digital signal processor(s) (DSP) 1104f. The audio DSP(s) 1104f may include elements for compression/decompression and echo cancellation and may include other suitable processing elements in other embodiments. Components of the baseband circuitry 1104 may be suitably combined in a single chip or a single chipset, or disposed on a same circuit board in some embodiments. In some embodiments, some or all of the constituent components of the baseband circuitry 1104 and the application circuitry 1102 may be implemented together, such as, for example, on a system on a chip (SOC).

In some embodiments, the baseband circuitry 1104 may provide for communication compatible with one or more radio technologies. For example, in some embodiments, the baseband circuitry 1104 may support communication with an EUTRAN and/or a WMAN, a WLAN, or a WPAN. Embodiments in which the baseband circuitry 1104 is configured to support radio communications of more than one wireless protocol may be referred to as multi-mode baseband circuitry.

The RF circuitry 1106 may enable communication with wireless networks using modulated electromagnetic radiation through a non-solid medium. In various embodiments, the RF circuitry 1106 may include switches, filters, amplifiers, et cetera to facilitate the communication with the wireless network. The RF circuitry 1106 may include a receive signal path which may include circuitry to down-convert RF signals received from the FEM circuitry 1108 and provide baseband signals to the baseband circuitry 1104. The RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b, and filter circuitry 1106c. The transmit signal path of the RF circuitry 1106 may include the filter circuitry 1106c and the mixer circuitry 1106a. The RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by the synthesizer circuitry 1106d. The amplifier circuitry 1106b may be configured to amplify the down-converted signals, and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by the filter circuitry 1106c. The filter circuitry 1106c may include an LPF, although the scope of the embodiments is not limited in this respect.

In some embodiments, the mixer circuitry 1106a of the receive signal path and the mixer circuitry 1106a of the transmit signal path may include two or more mixers and may be arranged for quadrature down conversion and/or up conversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a of the transmit signal path may be arranged for direct down conversion and/or direct up conversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect, as other types of frequency synthesizers may be suitable. For example, the synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 depending on the desired output frequency. In some embodiments, a divider control input (e.g., N) may be determined from a look-up table based on a channel indicated by the application circuitry 1102.

The synthesizer circuitry 1106*d* of the RF circuitry 1106 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

The FEM circuitry 1108 may include a receive signal path which may include circuitry configured to operate on RF signals received from the one or more antennas 1110, amplify the received signals, and provide the amplified versions of the received signals to the RF circuitry 1106 for further processing. The FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by the RF circuitry 1106), and one or more filters to generate RF signals for subsequent transmission (e.g., by one or more of the one or more antennas 1110).

In some embodiments, the UE 1100 comprises a plurality of power saving mechanisms. If the UE 1100 is in an RRC Connected state, where it is still connected to the eNB as it expects to receive traffic shortly, then it may enter a state known as Discontinuous Reception Mode (DRX) after a period of inactivity. During this state, the UE 1100 may power down for brief intervals of time and thus save power.

If there is no data traffic activity for an extended period of time, then the UE 1100 may transition to an RRC Idle state, where it disconnects from the network and does not perform operations such as channel quality feedback, handover, etc. The UE 1100 goes into a very low-power state and performs paging, wherein it periodically wakes up to listen to the network and then powers down again. The UE 1100 cannot receive data in this state, and in order to receive data, it transitions back to the RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed that the delay is acceptable.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:
1. An apparatus of an evolved node B (eNB), the eNB configured for Licensed Assisted Access (LAA) secondary cell (Scell) transmissions on multiple carriers, the apparatus comprising: processing circuitry; and memory, wherein the processing circuitry is configured to:
perform a channel access procedure on each carrier of a plurality of carriers before an LAA Scell transmission on multiple carriers, wherein the channel access procedure for each carrier for a physical downlink shared channel (PDSCH) transmission comprises:
first sensing a channel to be idle during slot durations of a defer duration;
decrementing a counter and sensing the channel to be idle for an additional slot duration; and
sense the channel until either a busy slot is detected within an additional defer duration or all the slots of the additional defer duration are detected to be idle; and
encode the PDSCH for transmission on the plurality of carriers, if the channel is sensed to be idle for at least in a slot duration when the eNB is ready to transmit the PDSCH and if the channel has been sensed to be idle during all the slot durations of a defer duration immediately before the transmission, and
wherein the memory is configured to store a value indicating the defer duration immediately before the transmission.

2. The apparatus of claim 1 wherein the processing circuitry is configured to maintain a common contention window for more than one channel of the SCell.

3. The apparatus of claim 2 wherein the processing circuitry is to configure the eNB for transmissions over a primary channel of a non-LAA Scell without performing a clear channel access procedure.

4. The apparatus of claim 3 wherein the processing circuitry is configured to adjust a value for the contention window based on access class priority.

5. The apparatus of claim 1, wherein as part of the channel access procedure for the LAA Scell transmission, the processing circuitry is to configure the eNB to sense the channel for a sensing interval of approximately 25 microseconds (us).

6. The apparatus of claim 1 wherein the processing circuitry comprises a baseband processor.

7. The apparatus of claim 6 further comprising: an interface to couple transceiver circuitry to the processing circuitry.

8. The apparatus of claim 7 wherein the processing circuitry generates baseband signals for transmission by the transceiver via multiple antennas.

9. A non-transitory computer-readable storage medium that stores instructions for execution by processing circuitry of an evolved node B (eNB), the eNB configured for Licensed Assisted Access (LAA) secondary cell (Scell) transmissions on multiple carriers, the processing circuitry configured to:
perform a channel access procedure on each carrier of a plurality of carriers before an LAA Scell transmission on multiple carriers, wherein the channel access procedure for each carrier for a physical downlink shared channel (PDSCH) transmission comprises:
first sensing a channel to be idle during slot durations of a defer duration;
decrementing a counter and sensing the channel to be idle for an additional slot duration; and
sense the channel until either a busy slot is detected within an additional defer duration or all the slots of the additional defer duration are detected to be idle; and
encode the PDSCH for transmission on the plurality of carriers, if the channel is sensed to be idle for at least in a slot duration when the eNB is ready to transmit the PDSCH and if the channel has been sensed to be idle during all the slot durations of a defer duration immediately before the transmission.

10. The non-transitory computer-readable storage medium of claim 9 wherein the processing circuitry is configured to maintain a common contention window for more than one channel of the SCell.

11. The non-transitory computer-readable storage medium of claim 10 wherein the processing circuitry is to configure the eNB for transmissions over a primary channel of a non-LAA Scell without performing a clear channel access procedure.

12. The non-transitory computer-readable storage medium of claim 11 wherein the processing circuitry is configured to adjust a value for the contention window based on access class priority.

13. The non-transitory computer-readable storage medium of claim 9, wherein as part of the channel access procedure for the LAA Scell transmission, the processing circuitry is to configure the eNB to sense the channel for a sensing interval of approximately 25 microseconds (us).

14. An apparatus of a user equipment (UE), the UE configured for Licensed Assisted Access (LAA) secondary cell (Scell) transmissions on multiple carriers, the apparatus comprising: processing circuitry; and memory,
wherein the processing circuitry is configured to:
perform a channel access procedure on each carrier of a plurality of carriers before an LAA Scell transmission on multiple carriers, wherein the channel access procedure for each carrier for a physical uplink shared channel (PUSCH) transmission comprises:
first sensing a channel to be idle during slot durations of a defer duration;
decrementing a counter and sensing the channel to be idle for an additional slot duration; and
sense the channel until either a busy slot is detected within an additional defer duration or all the slots of the additional defer duration are detected to be idle; and
encode the PUSCH for transmission on the plurality of carriers, if the channel is sensed to be idle for at least in a slot duration when the UE is ready to transmit the PUSCH and if the channel has been sensed to be idle during all the slot durations of a defer duration immediately before the transmission, and
wherein the memory is configured to store a value indicating the defer duration immediately before the transmission.

15. The apparatus of claim 14 wherein the processing circuitry is configured to maintain a common contention window for more than one channel of the SCell.

16. The apparatus of claim 15 wherein the processing circuitry is to configure the UE for transmissions over a primary channel of a non-LAA Scell without performing a clear channel access procedure.

17. The apparatus of claim 16 wherein the processing circuitry is configured to adjust a value for the contention window based on access class priority.

18. The apparatus of claim 14, wherein as part of the channel access procedure for the LAA Scell transmission, the processing circuitry is to configure the UE to sense the channel for a sensing interval of approximately 25 microseconds (us).

19. The apparatus of claim 14 wherein the processing circuitry comprises a baseband processor.

* * * * *

UNITED STATES PATENT AND TRADEMARK OFFICE
CERTIFICATE OF CORRECTION

PATENT NO. : 10,798,741 B2  
APPLICATION NO. : 16/523794  
DATED : October 6, 2020  
INVENTOR(S) : Bhorkar et al.

Page 1 of 1

It is certified that error appears in the above-identified patent and that said Letters Patent is hereby corrected as shown below:

In the Claims

In Column 25, Line 37, in Claim 5, delete "(us)." and insert --($\mu$s).-- therefor In Column 26, Line 21, in Claim 13, delete "(us)." and insert --($\mu$s).-- therefor In Column 26, Line 62, in Claim 18, delete "(us)." and insert --($\mu$s).-- therefor Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*